(12) United States Patent
Deslandes et al.

(10) Patent No.: US 10,949,580 B2
(45) Date of Patent: Mar. 16, 2021

(54) REPRESENTATION OF A SKELETON OF A MECHANICAL PART

(71) Applicant: DASSAULT SYSTEMES, Velizy Villacoublay (FR)

(72) Inventors: Arnaud Deslandes, Suresnes (FR); Karim Yousfi, Courbevoie (FR); Damien Tessier, Jouy en Josas (FR)

(73) Assignee: DASSAULT SYSTEMES, Velizy Villacoublay (FR)

( * ) Notice: Subject to any disclaimer, the term of this patent is extended or adjusted under 35 U.S.C. 154(b) by 536 days.

(21) Appl. No.: 15/701,079

(22) Filed: Sep. 11, 2017

(65) Prior Publication Data
US 2018/0075184 A1 Mar. 15, 2018

(30) Foreign Application Priority Data
Sep. 12, 2016 (EP) ..................................... 16306151

(51) Int. Cl.
*G06F 30/17* (2020.01)
*G06F 30/00* (2020.01)
*G06F 30/23* (2020.01)
*G06F 111/06* (2020.01)

(52) U.S. Cl.
CPC .............. *G06F 30/17* (2020.01); *G06F 30/00* (2020.01); *G06F 30/23* (2020.01); *G06F 2111/06* (2020.01)

(58) Field of Classification Search
CPC .. G06F 17/5086; G06F 17/50; G06F 17/5018; G06F 2217/08; G06F 30/17; G06F 30/00; G06F 30/23; G06F 2111/06; G06T 17/20; G06T 15/30

USPC ............................................................ 703/1
See application file for complete search history.

(56) References Cited

U.S. PATENT DOCUMENTS

| | | | | |
|---|---|---|---|---|
| 2003/0112239 | A1* | 6/2003 | Shin ................... | G06T 17/20 345/428 |
| 2006/0050073 | A1* | 3/2006 | Kanai .................. | G06T 17/20 345/423 |
| 2010/0262406 | A1* | 10/2010 | Goel ..................... | G06F 30/23 703/2 |

OTHER PUBLICATIONS

Au et al., Skeleton extraction by mesh contraction, 2008, ACM Transactions on Graphics, vol. 27, No. 3, pp. 44:1-44:10.*
Anthony J. Lockwood, Dassault SIMULIA Tosca Structure 8.0 for non-parametric structural optimization released, Feb. 19, 2014, 13 pages.*
Merriam-Webster.com Dictionary, Merriam-Webster, https://www.merriam-webster.com/dictionary/forbid. Accessed Aug. 24, 2020, pp. 1-3.*
https://www.macmillandictionary.com/us/dictionary/american/forbid, macmillandictionary.com online dictionary, printed Aug. 24, 2020, pp. 1.*

(Continued)

*Primary Examiner* — Juan C Ochoa
(74) *Attorney, Agent, or Firm* — Oblon, McClelland, Maier & Neustadt, L.L.P.

(57) ABSTRACT

The invention notably relates to a computer-implemented method for designing a mechanical part, the method comprising: providing a subset of a finite element mesh (FEM), the subset of the FEM representing the mechanical part; and determining a representation of a skeleton of the mechanical part based on the subset of the FEM, the skeleton having branches and branch junctions, each branch junction joining respective branches. This improves the designing of a mechanical part.

10 Claims, 12 Drawing Sheets

(56) References Cited

OTHER PUBLICATIONS https://www.dictionary.com/browse/forbid, dictionary.com online dictionary, printed Aug. 24, 2020, pp. 1.*
Thomas Stangl, et al.; "Feature Based Interpretation and Reconstruction of Structural Topology Optimization Results"; DS 80-6, Proceedings of the 20$^{th}$ International Conference on Engineering Design (ICED15); vol. 6: Desion Methods and Tools—Part 2; Milan, Italy; Jul. 30, 2015; XP055358180; 10 pages.
R. Balamurugan et al.; "A Two Phase Approach Based on Skeleton Convergence and Geometric Variables for Topology Optimization Using Genetic Algorithm"; Structural and Mltidisciplinary Optimization; Springer, Berlin; DE; vol. 43; No. 3; Sep. 1, 2010; XP019886494; ISSN: 1615-1488; DOI: 10.1007/S00158-010-0560-4; 24 pages.
Search Report dated Apr. 6, 2017, in Europe Patent Application No. 16306151.8-1954, 17 pages.
Tony DeRose, et al.; "Subdivision Surfaces in Character Animation"; Pixar Animation Studios; 10 pages, Jul. 1998.
Waqas Saleem, et al.; "Topology Optimization—Problem Formulation and Pragmatic Outcomes by Integration of TOSCA and CAE Tools"; Proceedings of the World Congress on Engineering and Computer Science 2008; WCECS 2008, Oct. 22-24, 2008; San Francisco, USA; 6 pages; ISBN: 978-988-98671-0-2.
Henk J.A.M. Heijmans; "Mathematical Morphology: A Geometrical Approach in Image Processing"; CWI; P.O. Box 4079; 1009 AB Amsterdam, The Netherlands; 40 pages., 1998.
Wenping Wang, et al.; "Computation of Rotation Minimizing Frames"; ACM Transactions on Graphics; vol. 27, No. 1; Article 2, Publication date: Mar. 2008; 18 pages.
P. Haussler, et al.; "Automated Topology Optimization of Flexible Components in Hybrid Finite Element Multibody Systems using ADAMS/Flex and MSC.Construct"; 16$^{th}$ European Adams User's Conference 2001; Institute of Machine Design, University of Karlsruhe, Germany; 16 pages.
Lu Liu; "3D Thinning on Cell Complexes for Computing Curve and Surface Skeletons"; A Thesis Presented to the School of Engineering of Washington University in St. Louis; Saint Louis, Missouri: May 2009; 41 pages.
Panos Papalambros, et al.; "Topological and Detailed Optimal Design of Structures"; The Universiry of Michigan, Mechanical Engineering & Applied Mechanics; Ann Arbor, MI; 9 pages., 1990.

* cited by examiner

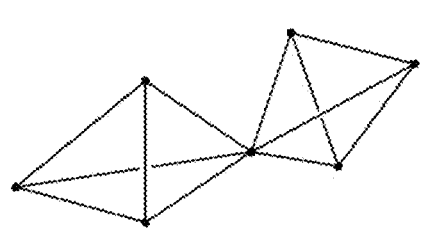
FIG. 7
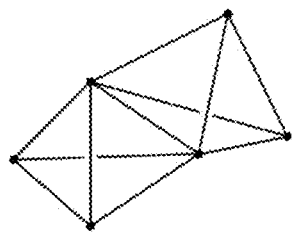
FIG. 8
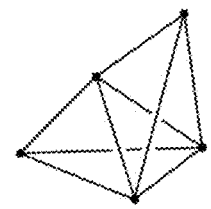
FIG. 9
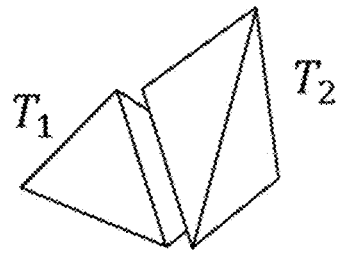
FIG. 10
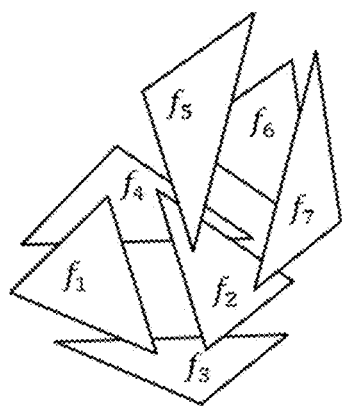
FIG. 11
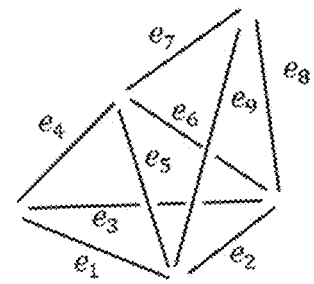
FIG. 12
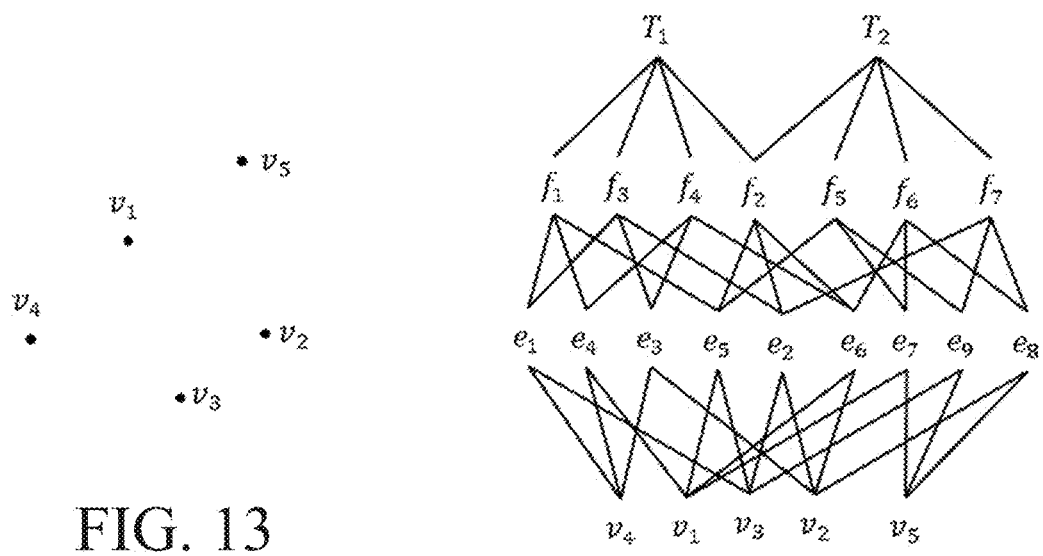
FIG. 13
FIG. 14

M

∂M

Shape(M)

Int(Shape(M))

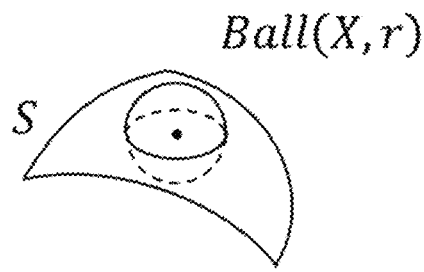
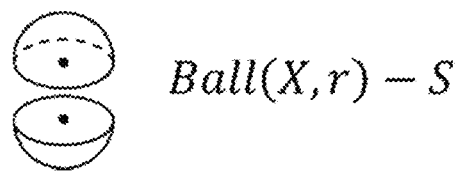
FIG. 20      FIG. 21
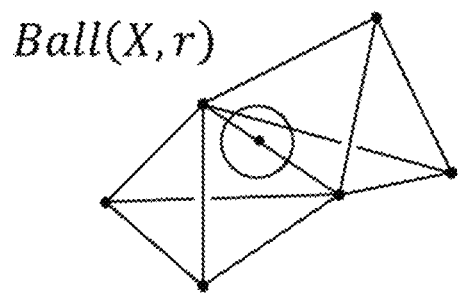
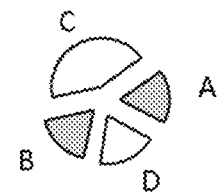
FIG. 22      FIG. 23
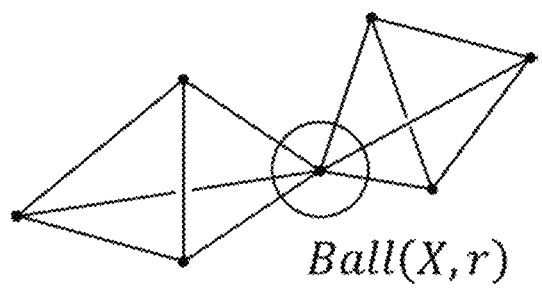
FIG. 24

$M'$ $Shape(M')$ $Int(Shape(M'))$

REPRESENTATION OF A SKELETON OF A MECHANICAL PART

CROSS-REFERENCE TO RELATED APPLICATIONS

This application claims priority under 35 U.S.C. § 119 or 365 to European Application No. 16306151.8, filed Sep. 12, 2016. The entire teachings of the above application(s) are incorporated herein by reference.

FIELD OF THE INVENTION

The invention relates to the field of computer programs and systems, and more specifically to a method, system and program for designing a mechanical part.

BACKGROUND

A number of systems and programs are offered on the market for the design, the engineering and the manufacturing of objects. CAD is an acronym for Computer-Aided Design, e.g. it relates to software solutions for designing an object. CAE is an acronym for Computer-Aided Engineering, e.g. it relates to software solutions for simulating the physical behavior of a future product. CAM is an acronym for Computer-Aided Manufacturing, e.g. it relates to software solutions for defining manufacturing processes and operations. In such computer-aided design systems, the graphical user interface plays an important role as regards the efficiency of the technique. These techniques may be embedded within Product Lifecycle Management (PLM) systems. PLM refers to a business strategy that helps companies to share product data, apply common processes, and leverage corporate knowledge for the development of products from conception to the end of their life, across the concept of extended enterprise. The PLM solutions provided by Dassault Systèmes (under the trademarks CATIA, ENOVIA and DELMIA) provide an Engineering Hub, which organizes product engineering knowledge, a Manufacturing Hub, which manages manufacturing engineering knowledge, and an Enterprise Hub which enables enterprise integrations and connections into both the Engineering and Manufacturing Hubs. All together the system delivers an open object model linking products, processes, resources to enable dynamic, knowledge-based product creation and decision support that drives optimized product definition, manufacturing preparation, production and service.

A well-known design technique in this field is referred to as "topology optimization" technology. This technique allows representing a mechanical part with a subset of a finite element mesh (FEM). Precisely, the mesh subset is an optimized topology computed by a finite elements analysis (FEA) process. Papers "Waqas Saleem, Hu Lu, Fan Yuqing, Topology Optimization. Problem Formulation and Pragmatic Outcomes by integration of TOSCA and CAE tools, WCECS 2008, Oct. 22-24, 2008, San Francisco, USA" and "Hauessler, P, Emmrich, D, Mueller, O, Ilzhoefer, B, Nowicki, L, Albers, A, Automated topology optimization of flexible components in hybrid finite elements multibody systems using Adams/Flex and MSC. Construct, 16th European ADAMS users' Conference 2001" present this technique. Topology optimization allows high automation of the design process, but the resulting meshed topology is not a perfectly accurate and comprehensive representation of the mechanical part being designed. Thus, mechanical designers further need to edit this meshed topology, for example manually in a traditional computer aided design (CAD) system. However, such edition is not easy and ergonomic with current systems.

Within this context, there is still a need for an improved solution for designing a mechanical part.

SUMMARY OF THE INVENTION

It is therefore provided a computer-implemented method for designing a mechanical part, the method comprising providing a subset of a finite element mesh (FEM), the subset of the FEM representing the mechanical part, and determining a representation of a skeleton of the mechanical part based on the subset of the FEM, the skeleton having branches and branch junctions, each branch junction joining respective branches.

The method may comprise one or more of the following:
- the representation of the skeleton has the same topology as the result of applying a thinning process to the subset;
- the result of applying the thinning process comprises elements of the FEM that each correspond to a respective branch extremity and elements of the FEM that each correspond to a respective branch junction, each element of the FEM that corresponds to a respective branch extremity sharing a face with a respective element of the FEM that corresponds to a branch junction;
- the thinning process forbids creation of a local non-manifold surface geometry;
- the subset results from a topology optimization process and has elements that correspond to boundary conditions of the topology optimization process, the thinning process forbidding removal of the elements of the subset that correspond to the boundary conditions of the topology optimization process;
- the thinning process comprises iterating removal of elements of the subset, the elements of the subset being removed at each respective iteration being all the boundary elements of the subset at the respective iteration whose removal is not forbidden;
- at each iteration the thinning process removes boundary elements of the subset according to their number of adjacency faces shared with another element of the subset, from the lowest number to the highest number;
- the method further comprises performing a design based on the representation of the skeleton; and/or
- the method further comprises, prior to providing the subset of the FEM, performing a topology optimization process to determine the subset of a FEM.

It is further provided a computer program comprising instructions for performing the method.

It is further provided a computer readable storage medium having recorded thereon the computer program.

It is further provided a system comprising a processor coupled to a memory and a graphical user interface, the memory having recorded thereon the computer program.

It is further provided a method for manufacturing a mechanical part designed according to the above method.

BRIEF DESCRIPTION OF THE DRAWINGS

Embodiments of the invention will now be described, by way of non-limiting example, and in reference to the accompanying drawings, where:

FIGS. 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67 and 68 illustrate the method.

DETAILED DESCRIPTION OF THE INVENTION

Figure 1:
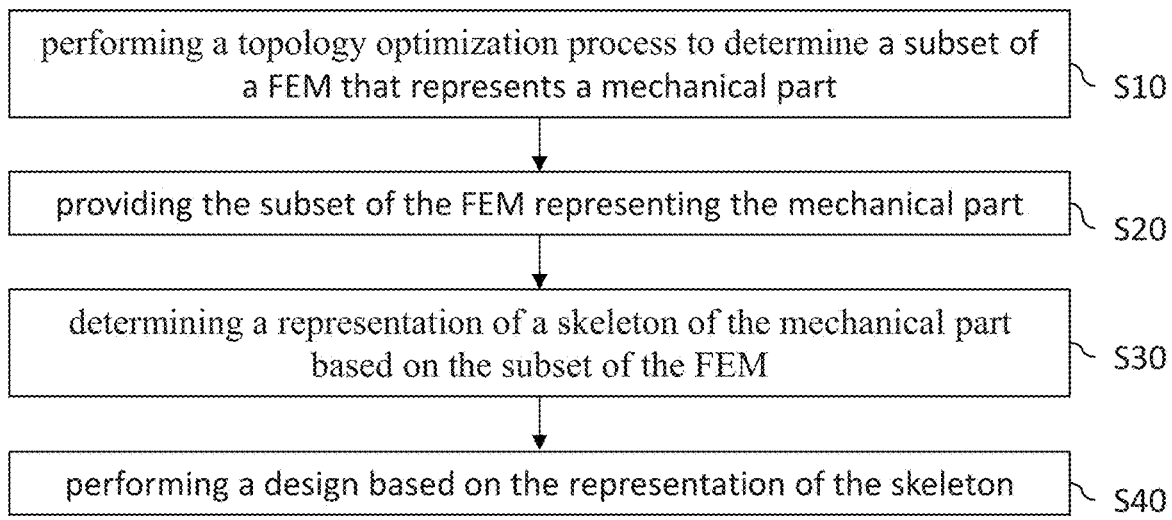
FIG. 1 shows a flowchart of an example of the method.

With reference to the flowchart of FIG. 1, it is proposed a computer-implemented method for designing a mechanical part. The method comprises providing S20 a subset of a finite element mesh (FEM). The subset of the FEM represents the mechanical part. The method also comprises determining S30 a representation of a skeleton of the mechanical part based on the subset of the FEM. By definition of a "skeleton", the skeleton has branches (i.e. one-dimensional extensions of material) and branch junctions (i.e. material locations where branches join), and each branch junction joins respective branches. Such a method improves the designing of a mechanical part.

Notably, the method is provided at S20 with a mesh representation of the mechanical part, and the method determines at S30 another representation related to the mechanical part, that is, the representation of a skeleton of the mechanical part. The method may thus enrich the data representing the mechanical part provided at S20 with the data determined at S30, thereby adding a new type of representation of the mechanical part that goes with new design capabilities offered to the user. Furthermore, the data determined at S30 is a representation of a skeleton of the mechanical part. Thus, where the mechanical part is initially represented only at a very granular level when providing at S20 a subset of a mesh, the method determines at S30 a representation of a higher level, namely the representation of a skeleton of the mechanical part. This allows new design capabilities, and design operations of a relatively high level. Indeed, the method allows skeleton-level design of the mechanical part, thanks to the data determined at S30. The skeleton-level in specific is a particularly relevant design level in the field of mechanical design, as mechanical parts are viewed by mechanical designers in terms of their skeleton in many situations. Allowing skeleton-level design is thus particularly ergonomic in mechanical design.

The method is computer-implemented. This means that the steps (or substantially all the steps) of the method are executed by at least one computer, or any system alike. Thus, steps of the method are performed by the computer, possibly fully automatically, or, semi-automatically. In examples, the triggering of at least some of the steps of the method may be performed through user-computer interaction. For example, later-discussed steps S10 and S40 may be performed via user-interaction, while step S20 may (e.g. only) be triggered by the user and step S30 performed fully automatically upon S20 being triggered. The level of user-computer interaction required may depend on the level of automatism foreseen and put in balance with the need to implement user's wishes. In examples, this level may be user-defined and/or pre-defined.

A typical example of computer-implementation of the method is to perform the method with a system adapted for this purpose. The system may comprise a processor coupled to a memory and a graphical user interface (GUI), the memory having recorded thereon a computer program comprising instructions for performing the method. The memory may also store a database. The memory is any hardware adapted for such storage, possibly comprising several physical distinct parts (e.g. one for the program, and possibly one for the database).

The method generally manipulates modeled objects, including the FEM with its subset, and the skeleton representation. A modeled object is any object defined by data stored e.g. in the database. By extension, the expression "modeled object" designates the data itself. According to the type of the system, the modeled objects may be defined by different kinds of data. The system may indeed be any combination of a CAD system, a CAE system, a CAM system, a PDM system and/or a PLM system. In those different systems, modeled objects are defined by corresponding data. One may accordingly speak of CAD object, PLM object, PDM object, CAE object, CAM object, CAD data, PLM data, PDM data, CAM data, CAE data. However, these systems are not exclusive one of the other, as a modeled object may be defined by data corresponding to any combination of these systems. A system may thus well be both a CAD and PLM system, as will be apparent from the definitions of such systems provided below.

By CAD system, it is additionally meant any system adapted at least for designing a modeled object on the basis of a graphical representation of the modeled object, such as CATIA. In this case, the data defining a modeled object comprise data allowing the representation of the modeled object. A CAD system may for example provide a representation of CAD modeled objects using edges or lines, in certain cases with faces or surfaces. Lines, edges, or surfaces may be represented in various manners, e.g. non-uniform rational B-splines (NURBS). Specifically, a CAD file contains specifications, from which geometry may be generated, which in turn allows for a representation to be generated. Specifications of a modeled object may be stored in a single CAD file or multiple ones. The typical size of a file representing a modeled object in a CAD system is in the range of one Megabyte per part. And a modeled object may typically be an assembly of thousands of parts.

In the context of CAD, a modeled object may typically be a 3D modeled object, e.g. representing a product such as a part or an assembly of parts, or possibly an assembly of products. By "3D modeled object", it is meant any object which is modeled by data allowing its 3D representation. A 3D representation allows the viewing of the part from all angles. For example, a 3D modeled object, when 3D represented, may be handled and turned around any of its axes, or around any axis in the screen on which the representation is displayed. This notably excludes 2D icons, which are not 3D modeled. The display of a 3D representation facilitates design (i.e. increases the speed at which designers statistically accomplish their task). This speeds up the manufacturing process in the industry, as the design of the products is part of the manufacturing process.

A 3D modeled object may represent the geometry of a product to be manufactured in the real world subsequent to the completion of its virtual design with for instance a CAD software solution or CAD system, such as a (e.g. mechanical) part or assembly of parts (or equivalently an assembly of parts, as the assembly of parts may be seen as a part itself from the point of view of the method, or the method may be applied independently to each part of the assembly), or more generally any rigid body assembly (e.g. a mobile mechanism). A CAD software solution allows the design of products in various and unlimited industrial fields, including: aerospace, architecture, construction, consumer goods, hightech devices, industrial equipment, transportation, marine, and/or offshore oil/gas production or transportation. The mechanical part designed by the method may thus be an industrial product which may be any mechanical part, such as a part of a terrestrial vehicle (including e.g. car and light truck equipment, racing cars, motorcycles, truck and motor equipment, trucks and buses, trains), a part of an aerial vehicle (including e.g. airframe equipment, aerospace equipment, propulsion equipment, defense products, airline equipment, space equipment), a part of a naval vehicle (including e.g. navy equipment, commercial ships, offshore equipment, yachts and workboats, marine equipment), a general mechanical part (including e.g. industrial manufacturing machinery, heavy mobile machinery or equipment, installed equipment, industrial equipment product, fabricated metal product, tire manufacturing product), or an electro-mechanical part (including e.g. consumer electronics, security and/or control and/or instrumentation products, computing and communication equipment, semiconductors, medical devices and equipment). The expression "mechanical part" may also (or, alternatively, may not) designate a consumer good (including e.g. furniture, home and garden products, leisure goods, fashion products, hard goods retailers' products, soft goods retailers' products), a packaging (including e.g. food and beverage and tobacco, beauty and personal care, household product packaging).

A CAD system may be history-based. In this case, a modeled object is further defined by data comprising a history of geometrical features. A modeled object may indeed be designed by a physical person (i.e. the designer/user) using standard modeling features (e.g. extrude, revolute, cut, and/or round) and/or standard surfacing features (e.g. sweep, blend, loft, fill, deform, and/or smoothing). Many CAD systems supporting such modeling functions are history-based system. This means that the creation history of design features is typically saved through an acyclic data flow linking the said geometrical features together through input and output links. The history based modeling paradigm is well known since the beginning of the 80's. A modeled object may be described by two persistent data representations: history and B-rep (i.e. boundary representation). The B-rep is the result of the computations defined in the history. The shape of the part displayed on the screen of the computer when the modeled object is represented is (e.g. a tessellation of) the B-rep. The history of the part is the design intent. Basically, the history gathers the information on the operations which the modeled object has undergone. The B-rep may be saved together with the history, to make it easier to display complex parts. The history may be saved together with the B-rep in order to allow design changes of the part according to the design intent.

By PLM system, it is additionally meant any system adapted for the management of a modeled object representing a physical manufactured product (or product to be manufactured). In a PLM system, a modeled object is thus defined by data suitable for the manufacturing of a physical object. These may typically be dimension values and/or tolerance values. For a correct manufacturing of an object, it is indeed better to have such values.

By CAM solution, it is additionally meant any solution, software of hardware, adapted for managing the manufacturing data of a product. The manufacturing data generally includes data related to the product to manufacture, the manufacturing process and the required resources. A CAM solution is used to plan and optimize the whole manufacturing process of a product. For instance, it can provide the CAM users with information on the feasibility, the duration of a manufacturing process or the number of resources, such as specific robots, that may be used at a specific step of the manufacturing process; and thus allowing decision on management or required investment. CAM is a subsequent process after a CAD process and potential CAE process. Such CAM solutions are provided by Dassault Systèmes under the trademark DELMIA®.

By CAE solution, it is additionally meant any solution, software of hardware, adapted for the analysis of the physical behavior of modeled object. A well-known and widely used CAE technique is the Finite Element Method (FEM) which typically involves a division of a modeled objet into elements which physical behaviors can be computed and simulated through equations. Such CAE solutions are provided by Dassault Systemes under the trademark SIMULIA®. Another growing CAE technique involves the modeling and analysis of complex systems composed of a plurality components from different fields of physics without CAD geometry data. CAE solutions allows the simulation and thus the optimization, the improvement and the validation of products to manufacture. Such CAE solutions are provided by Dassault Systemes under the trademark DYMOLA®.

PDM stands for Product Data Management. By PDM solution, it is meant any solution, software of hardware, adapted for managing all types of data related to a particular product. A PDM solution may be used by all actors involved in the lifecycle of a product: primarily engineers but also including project managers, finance people, sales people and buyers. A PDM solution is generally based on a product-oriented database. It allows the actors to share consistent data on their products and therefore prevents actors from using divergent data. Such PDM solutions are provided by Dassault Systemes under the trademark ENOVIA®.

Figure 2:
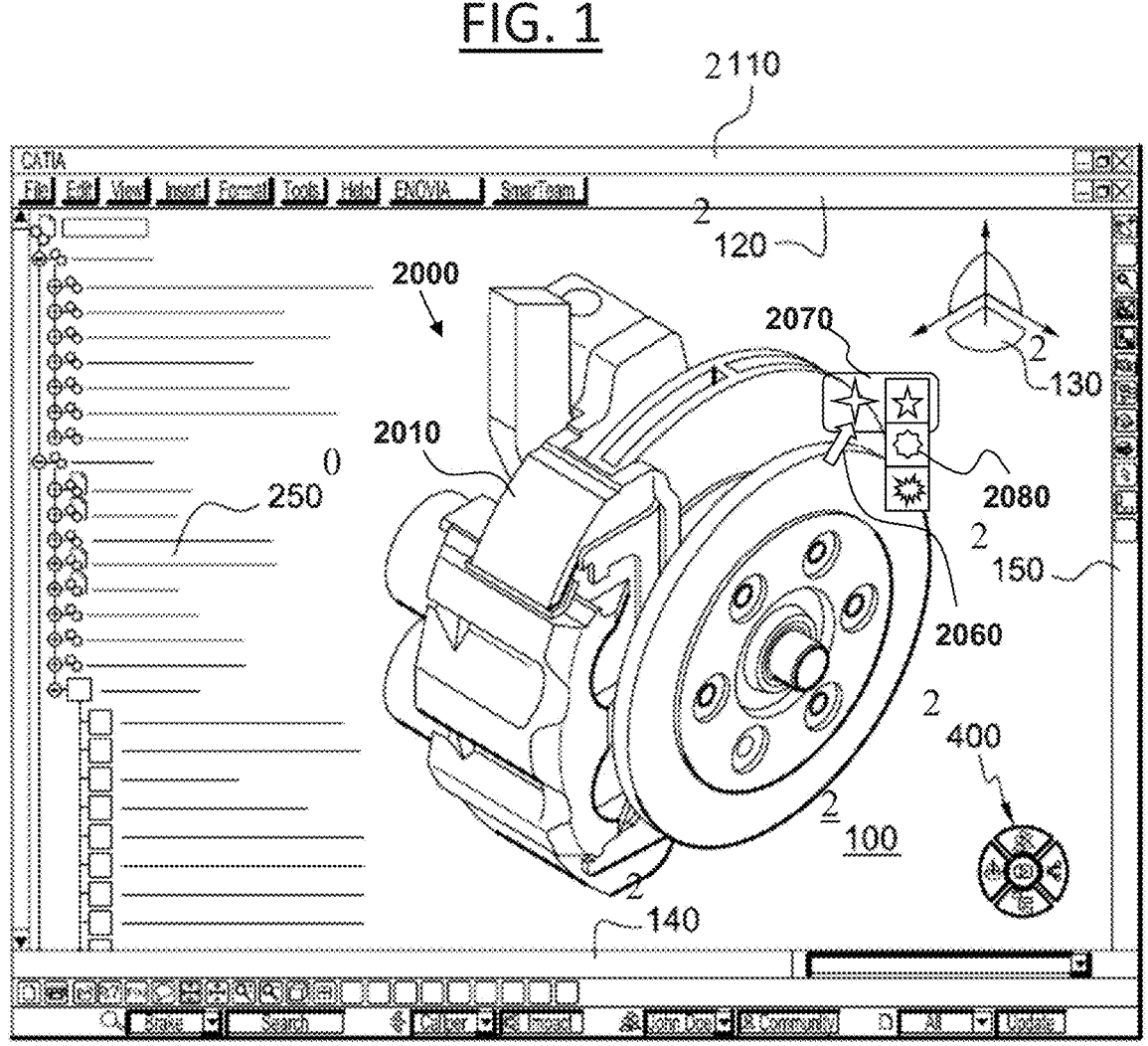
FIG. 2 shows an example of a graphical user interface of the system.

FIG. 2 shows an example of the GUI of a system that may be used to implement the method, wherein the system is a CAD system.

The GUI 2100 may be a typical CAD-like interface, having standard menu bars 2110, 2120, as well as bottom and side toolbars 2140, 2150. Such menu- and toolbars contain a set of user-selectable icons, each icon being associated with one or more operations or functions, as known in the art. Some of these icons are associated with software tools, adapted for editing and/or working on the 3D modeled object 2000 displayed in the GUI 2100, which may be the result of the method of FIG. 1 (e.g. after performing S30 or S40). The software tools may be grouped into workbenches. Each workbench comprises a subset of software tools. In particular, one of the workbenches is an edition workbench, suitable for editing geometrical features of the modeled product 2000. In operation, a designer may for example pre-select a part of the object 2000 and then initiate an operation (e.g. change the dimension, color, etc.) or edit geometrical constraints by selecting an appropriate icon. For example, typical CAD operations are the modeling of the punching or the folding of the 3D modeled object displayed on the screen. The GUI may for example display data 2500 related to the displayed product 2000. In the example of FIG. 2, the data 2500, displayed as a "feature tree", and their 3D representation 2000 pertain to a brake assembly including brake caliper and disc. The GUI may further show various types of graphic tools 2130, 2070, 2080 for example for facilitating 3D orientation of the object, for triggering a simulation of an operation of an edited product or render various attributes of the displayed product 2000. A cursor 2060 may be controlled by a haptic device to allow the user to interact with the graphic tools.

Figure 3:
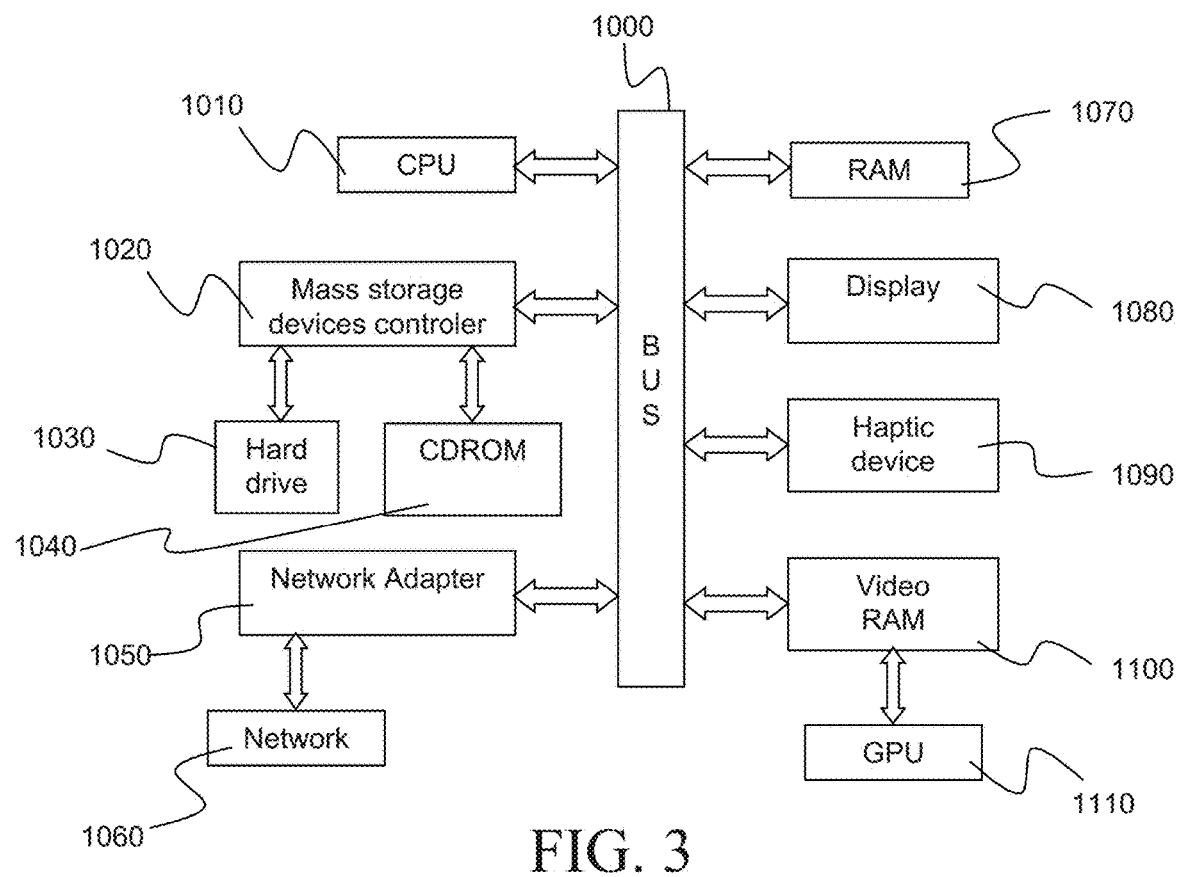
FIG. 3 shows an example of the system.

FIG. 3 shows an example of the system, wherein the system is a client computer system, e.g. a workstation of a user.

The client computer of the example comprises a central processing unit (CPU) 1010 connected to an internal communication BUS 1000, a random access memory (RAM) 1070 also connected to the BUS. The client computer is further provided with a graphical processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks 1040. Any of the foregoing may be supplemented by, or incorporated in, specially designed ASICs (application-specific integrated circuits). A network adapter 1050 manages accesses to a network 1060. The client computer may also include a haptic device 1090 such as cursor control device, a keyboard or the like. A cursor control device is used in the client computer to permit the user to selectively position a cursor at any desired location on display 1080. In addition, the cursor control device allows the user to select various commands, and input control signals. The cursor control device includes a number of signal generation devices for input control signals to system. Typically, a cursor control device may be a mouse, the button of the mouse being used to generate the signals. Alternatively or additionally, the client computer system may comprise a sensitive pad, and/or a sensitive screen.

The computer program may comprise instructions executable by a computer, the instructions comprising means for causing the above system to perform the method. The program may be recordable on any data storage medium, including the memory of the system. The program may for example be implemented in digital electronic circuitry, or in computer hardware, firmware, software, or in combinations of them. The program may be implemented as an apparatus, for example a product tangibly embodied in a machine-readable storage device for execution by a programmable processor. Method steps may be performed by a programmable processor executing a program of instructions to perform functions of the method by operating on input data and generating output. The processor may thus be programmable and coupled to receive data and instructions from, and to transmit data and instructions to, a data storage system, at least one input device, and at least one output device. The application program may be implemented in a high-level procedural or object-oriented programming language, or in assembly or machine language if desired. In any case, the language may be a compiled or interpreted language. The program may be a full installation program or an update program. Application of the program on the system results in any case in instructions for performing the method.

"Designing a modeled object" such as a modeled object representing a mechanical part (also referred to as "designing a mechanical part") designates any action or series of actions which is at least part of a process of elaborating a modeled object.

The method may be included in a manufacturing process, which may comprise, after performing the method, producing a physical product corresponding to the modeled object.

In any case, the modeled object designed by the method represents a mechanical part, thus a manufacturing object. The modeled object may thus be a modeled solid (i.e. a modeled object that represents a solid). The manufacturing object may be a product, such as a part, or an assembly of parts. Because the method improves the design of the modeled object, the method also improves the manufacturing of a product and thus increases productivity of the manufacturing process.

The method of FIG. 1 is now discussed in more details.

The data provided at S20 is a subset of a FEM that represents the mechanical part. In the example of FIG. 1, this data structure is obtained as a result of a prior step S10 consisting in performing a topology optimization process to determine said subset of a FEM that represents the mechanical part (which may be followed by a cleaning process, prior to S20 and/or S30, for example for removing slivers, cracks and/or small cavities—e.g. of the size of the order of one FEM element, for example less than five elements). The same type of data structure may be obtained in other ways and/or the topology optimization may be performed at another time and/or system (e.g. by another person), and as long as a FEM having a subset representing a mechanical part is provided at S20, the remaining steps (including S30) may be executed.

The method of FIG. 1 thus deals with post processing a mechanical part obtained by using the "topology optimization" technology. There are several reasons why one can benefit from making the result editable by the user. Firstly, not all the constraints can be taken into account by the topology optimization process (e.g. including fluid mechanics, aesthetic, and/or manufacturing), such that the part may be improved by being reworked. More generally, existing topology optimization processes provide a result that can be improved for any reason. Thanks to their structure design skills, expert users are able to rework the resulting part into a lighter and more resistant one e.g. by operations including adding or removing a branch, modifying the section of a branch, and/or replacing a branch by a stiffener. In fact, the "optimized" part may be a starting point or an inspirational reference for the skilled user.

A topology optimization process is a widely known computer-implemented method for determining a subset of a FEM, such that the subset represents a mechanical part. Topology optimization is a way to automatically create the original topology of a mechanical part. A topology optimization process may comprise first providing a FEM. A FEM is a data structure that represents a subdivision of a space intended to be occupied by the mechanical part. In other words, a FEM represents a—e.g. connected and/or convex—space, and the mechanical part is a solid localized in such space and thus definable by a subset of such space. The FEM is a mesh structure (e.g. a tetrahedral, pyramidal or cubic mesh structure), e.g. 2D or 3D, and elements of the FEM (i.e. units of the mesh, e.g. elementary tetrahedrons, pyramids or cubes) each represent a cell of the space.

A topology optimization process may then comprise setting boundary conditions to the FEM. Setting a boundary condition may comprise or consist of defining a mechanical constraint on a corresponding element of the FEM. As a result, the elements of the FEM that correspond to respective boundary conditions are included in the subset resulting from the topology optimization. The set of all boundary conditions is representative of the application of predetermined mechanical constraints to the mechanical part (in other words, mechanical constraints that the mechanical part is to be submitted to).

A topology optimization process may then comprise determining a subset of the FEM (e.g. strictly speaking, that is, strictly smaller that the FEM) that forms a geometry representative of the mechanical part. The determining may reward resistance to the boundary conditions and sparsity. In other words, the determining may be performed via an optimization program that penalizes an arrangement of elements of the FEM being included in the subset that presents low resistance to the boundary conditions while also penalizing a high number of elements of the FEM being included in the subset. Such determining may be performed by automatically calculating a scalar contribution of each element of the FEM with respect to the boundary conditions, and then performing a filtering (e.g. automatically with a predetermined fixed or variable threshold or via user-interaction with a user setting/selecting a threshold).

In examples, the input data may represent a thick block of homogeneous material (meaning that the material density p is everywhere equal to 1), named the "design space" on which strength, load, constraint boundary conditions are defined. The shape of the design space and the boundary conditions may be defined by the user. Then, the design space may be meshed in order to provide a finite element tetrahedral meshing. This may be performed with any state of the art meshing algorithms. Then, an iterative process may be run as follows. In a first step, the finite element analysis is run with these input data. Classically, it solves the partial differential equations of structural mechanics. Generally, high stresses are concentrated in the neighborhood of the constrained areas. Thus, there are extended areas inside the design space that are almost under no stress. This is the opportunity for the topology optimization to decrease the material density of the "no stress" areas while saving the overall behavior. Since the material density is changed, a new finite element analysis is run to compute the new stress configuration. This is performed iteratively until a stopping test is reached. The stopping test may be reached under any or a combination of the following conditions: the density field cannot be optimized, a predefined number of iterations is reached, and/or a predefined weight ratio is reached (e.g. the resulting mass is more than 20% or 30% lighter e.g. of the order 45% lighter).

In examples, each tetrahedron of the mesh may be associated with a real number in the [0,1] interval: the final density field. Value 0 may mean that there is no material in the tetrahedron; value 1 may mean that the tetrahedron is filled with the initial homogeneous material. Other density values may mean that "less" material is required in the tetrahedron. Since a variable density material is unrealistic from the manufacturing point of view, small density tetrahedrons may be interpreted as empty tetrahedrons. Consequently, tetrahedrons may be removed from the initial mesh according to a numerical threshold $0<\rho_0<1$. Any tetrahedron featuring a density value that is smaller than $\rho_0$ may be removed from the mesh. This operation generally creates bumps, voids and branches and thus highly affects the topology of the initial design space. This yields the so-called optimized topology.

Figure 4:
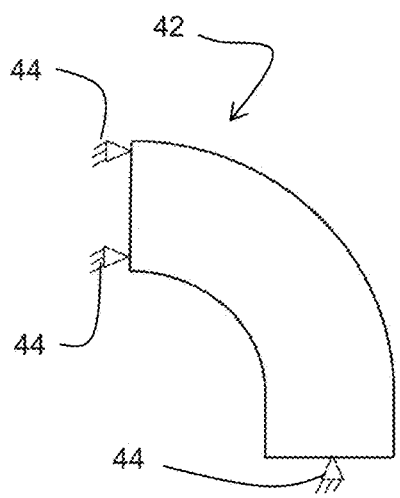
Figure 5:
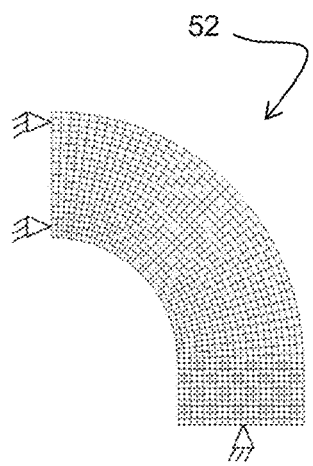
Figure 6:
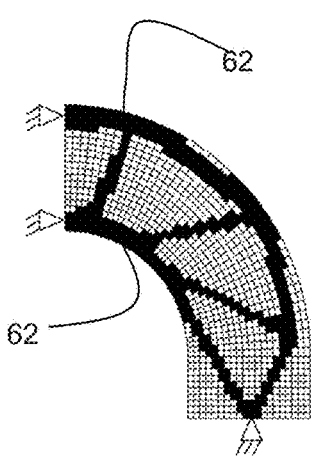

FIGS. 4-6 illustrate an example of a 2D application of topology optimization such as above: the design space 42 with represented constraints 44, the meshed design space 52 and the amount of material that actually contributes to the function of the part (black elements 62 of the mesh). Boundary conditions 44 are self-explanatory. It should be noticed that the solution is in the real case out of reach of a skilled mechanical designer.

The topology process performed at S10 by the method of FIG. 1 may be as described above, for example as described in any one of earlier-mentioned papers "Waqas Saleem, Hu Lu, Fan Yuqing, Topology Optimization. Problem Formulation and Pragmatic Outcomes by integration of TOSCA and CAE tools, WCECS 2008, Oct. 22-24, 2008, San Francisco, USA" and "Houessler, P, Emmrich, D, Mueller, O, Ilzhoefer, B, Nowicki, L, Albers, A, Automated topology optimization of flexible components in hybrid finite elements multibody systems using Adams/Flex and MSC. Construct, 16th European ADAMS users' Conference 2001".

Now, as mentioned earlier, the tetrahedral mesh resulting from the topology optimization is not editable by itself in an easy way, at least at a skeleton resolution. This is an issue because it should be edited for redesign and manufacturing preparation purposes. The method of FIG. 1 thus increases ergonomics by providing an editable format of the meshed topology. This is thanks to the method of FIG. 1 comprising (e.g. automatically) determining S30 a representation of a skeleton of the mechanical part based on the subset of the FEM. The user can then perform, if wanted (at S40 in the example of FIG. 1), design operations based on the representation of the skeleton. Such design operations may include editing the skeleton, i.e. editing the (e.g. 3D) modeled object representing the mechanical part mechanical at the skeleton-level. This means that the user can directly act on parameters of the skeleton, for example with operations including adding or removing a branch, modifying the section, position, length and/or shape of a branch, and/or replacing a branch by a stiffener.

A skeleton is indeed, by definition, an arrangement of branches connected at branch junctions, each branch junction joining respective branches. A branch is an arrangement of material that extends one-dimensionally. The data structure representing a skeleton can be of any form, as long as it includes pieces of data that each represent a respective branch. These branch-representing pieces of data may be swept solids, for example each with a guiding (e.g. spline) curves associated to a section distribution, as in examples discussed later. Any other type of (e.g. geometrical) pieces of data may represent the branches. These branch-representing pieces of data are each well-defined in the data structure and therefore individually accessible, such that the user can perform at S40 any combination of design operations that take these branch-representing pieces of data as input. The user may thereby modify branch parameters, e.g. including adding and/or removing branches, modifying position, length, shape and/or section of branches.

The data structure may also comprise pieces of data that represent branch junctions and/or data relative to the arrangement between the branches, for example data relative to which branches are joined and/or which branch junctions join which branches. In such a case, the design at S40 can be more refined. Such skeleton-level edition may in examples be performed graphically, for example with the user interacting with a graphical representation of the mechanical part to select a whole branch and then manipulate the selected branch so as to make an edition of the branch at once (e.g. in a single user action, e.g. a graphical user action, such as a cursor-control action e.g. including a drag-and-drop).

For example, the method may yield after S30 a history of features including swept solids (e.g. each swept solid being associated to a guiding curve and data representing distribution of the section of the swept solid along the guiding curve), and possible other features such as fillets or any other features. In such a case, the method may provide to a mechanical designer a list or a representation of a history between such features, for example less than 100 features for a big model, as opposed to the result of the topology optimization which may output more than 1 million elements in the subset.

Thus, the method leads to data representative of each individual branch (and possibly each individual branch junction), such data being at a higher level (or equivalently, a representation of a lower dimension) than a mere aggregation of local geometry that forms the part (such as the initial FEM subset). Also, the representation may be such that each branch junction joins at least three respective branches, but alternatively the representation may be such that at least one branch junction joins only two branches (depending on the design intent). The method may thus automatically provide the appropriate semantic level for edition because each branch of the topology is a single feature (e.g. a swept solid). It can be edited by changing the profile shape and/or the spine curve shape. Compared to prior art, the edition is made easier and faster, reducing the redesign phase and manufacturing preparation.

Without the method, a solution to rework the output of a topology optimization may include letting the user re-design a solid or surface by using a commercial CAD system. This redesign would then be performed from scratch, the meshed topology being an inspiring background shape. However, redesigning the solid from scratch is tedious and time consuming because the meshed topology can be very complex. Also, in this case the result would not necessarily be editable at the branch-level. The method improves ergonomics with respect to these issues.

The method provides a skeleton that can be used as input to build a solid using a commercial CAD system. For example, the branches can be used as guide curves for sweep features.

The representation of the skeleton determined at S30 may have the same topology as the result of applying a thinning process to the subset. This means that the determining S30 can consist in performing a thinning process taking the subset as input and then possibly other operations that maintain the topology (such as computing swept volumes in examples provided later), or any other equivalent scheme in terms of resulting topology. Prior art thinning processes are disclosed in papers "Liu, L, 3D thinning on cell complexes for computing curve and surface skeletons, Master of Science, Saint Louis, Mo., 2009" and "Stangl, L, Wartzack, S, Feature based interpretation and reconstruction of structural topology optimization results, ICED15, 27-30 Jul. 2015, Politecnico di Milano, Italy". In the case of the method, the thinning process is a process that iteratively reduces the size of the subset, e.g. by iterating removal of elements of the subset (i.e. repeating the removing of one or more element (s) of the subset), e.g. as long as possible (i.e. as long as there are elements) but penalizing non-preservation of topology (e.g. but not strictly forbidding such non-preservation), e.g. forbidding non-preservation of topology of the interior of the shape defined by subset (the notion of "interior" is defined later). Performing the thinning process, such as explained in later examples, is a particularly efficient way of performing the determining S30.

The result of applying the thinning process consists in a subset of the subset provided at S20 and is thus itself also a subset of the FEM. Elements of the result of applying the thinning process each correspond to (i.e. represent, or belong to) a respective branch of the skeleton and/or to a respective branch junction. Among elements of the result of applying the thinning process that correspond to a respective branch of the skeleton, elements correspond each to a respective extremity (i.e. end) of the branch, for example exactly one element per extremity in case of a one-dimensional arrangement e.g. of tetrahedrons (i.e. the "last" element of the branch). In examples, each element of the result corresponds to either a respective branch or a respective branch junction. Each element that corresponds to a respective branch extremity meets with (i.e. connects) a respective element of the FEM that corresponds to a branch junction, which is specifically the branch junction where the branch extremity arrives.

In examples, the result has no element sharing strictly more than two faces with other elements, other than possibly those that correspond to branch junctions. In other words, only elements that correspond to a branch junction may share strictly more than two faces with other elements in the final result of applying the thinning process. It is said that two elements share a face if both elements each have a respective face (i.e. a planar exterior side) that geometrically coincide. For example, in the case of a tetrahedral mesh, an element may share at most four faces with other elements, in which case all its faces are "full". Thereby, the thinning process in a way thins the subset provided at S20 to the maximum extent possible.

In such examples, the result of applying the thinning process may correspond to a network of one-dimensional arrangements of adjacent elements, that can thus each be browsed linearly. Thus, the determining S30 may consist in browsing the result of applying the thinning process (e.g. with a depth-first search or any equivalent browsing), and during the browsing automatically identifying elements that correspond to a branch (e.g. while it is detected that no bifurcation is possible) and elements that correspond to a branch junction (e.g. when it is detected that a bifurcation is possible, e.g. when an element sharing strictly more than two faces with other elements is encountered), and automatically grouping elements that correspond to a same branch junction (e.g. from a first detection of a branch junction and until detecting that no bifurcation is possible) or a same branch together (e.g. between two consecutive detections of elements that correspond to a branch junction). This identifying and grouping may provide as such a representation of the skeleton. But in examples, the determining S30 may comprise further steps such as earlier-mentioned and later-detailed swept volume computation examples.

Now, each element of the result of applying the thinning process that corresponds to an extremity of a branch shares a face with a respective element of the result of applying the thinning process that corresponds to a branch junction. This not only means that elements of the result of applying the thinning process that can be defined as corresponding to an extremity of a branch can only be ones who share a face with a respective element of the result of applying the thinning process that corresponds to a branch junction, but this also means that there is such face-sharing at each connection between a branch extremity and a branch junction (because a branch extremity has necessarily at least one element corresponding to it in the result of applying the thinning process, e.g. exactly one in the example of a tetrahedral FEM thinned to the maximum). The expression "sharing a face", again, means that a face of the former element is superposed to (or confounded with, or yet geometrically identical to) a respective face of the later element.

In other words, the thinning process may be configured to forbid that, in the result, a branch arrives at a branch junction by forming a local non-manifold surface geometry (e.g. a non-manifold edge with respect to the boundary surface of the result of applying the thinning process). A local non-manifold surface geometry of a given object is a geometry (i.e. a geometrical entity, such as an edge) located on the boundary surface of the given object that is non-manifold with respect to said boundary surface. The concept of non-manifold is known per se but yet defined later. Similarly, in case a branch junction corresponds to strictly more than one respective element of the result, the thinning process may be configured to forbid that, in the result, such branch junction contains a local non-manifold surface geometry. Also, the thinning process may forbid creation of a local non-manifold surface geometry. In other words, each operation step of the thinning process is constrained so as not to yield a local non-manifold surface geometry. More generally, any step of the method may forbid creation of a local non-manifold surface geometry (i.e. the step is configured to be executed in a way that local non-manifold is not created). This avoidance of local non-manifold surface geometry increases accuracy of the result.

This improves over prior art thinning processes (such as those mentioned earlier). Indeed, prior art thinning processes save the exact topology of the closed initial object, creating or maintaining local non-manifold surface geometry if necessary for such purpose. This is not appropriate because, in the context of mechanical design and topology optimization results, the relevant topology is the interior of the initial object. This is detailed later.

In examples, the input of the method is a tetrahedral meshed topology resulting from a topology optimization. The output is a solid part made of history based features, mainly swept solids each representing a respective branch of a skeleton. Computing the history based features may involve the following steps. Firstly, the input tetrahedral mesh is cleaned by removing slivers, cracks and small cavities. Then, an erosion-like process (i.e. the thinning process) iteratively eliminates tetrahedrons until a thin version of the topology is reached: the "thin mesh". This thin mesh is made of tetrahedrons, e.g. as opposed to a line segments skeleton. Then, a wireframe graph made of connected smooth curves is built on the thin mesh using branch tetrahedrons, node tetrahedrons. This graph captures the relevant topology of the input tetrahedral mesh. Finally, an editable swept solid is built on each branch, using smooth curves as spine curves. All swept solids are added together yielding the resulting editable solid.

In examples, the subset of the FEM provided at S20 has elements that correspond to boundary conditions of the topology optimization process. The thinning process may forbid removal of the elements of the subset that correspond to the boundary conditions of the topology optimization process. In other words, the thinning process may be configured so as not to remove elements of the subset on which a boundary conditions is defined, for example at the time of S10. For example, said elements may be marked or tagged by data representative of the fact that they should not be removed. Thus, the method leapfrogs thinning problems of prior art thinning algorithms by setting fixed tetrahedrons at the very beginning of the process. The thinning algorithm is not allowed to remove them, which makes the thin shape compliant with the initial one. This allows reaching the intended skeleton in a simple way, contrary to prior art thinning processes which may implement complex criteria including distance from a starting model.

Figures 66, 67, 68:
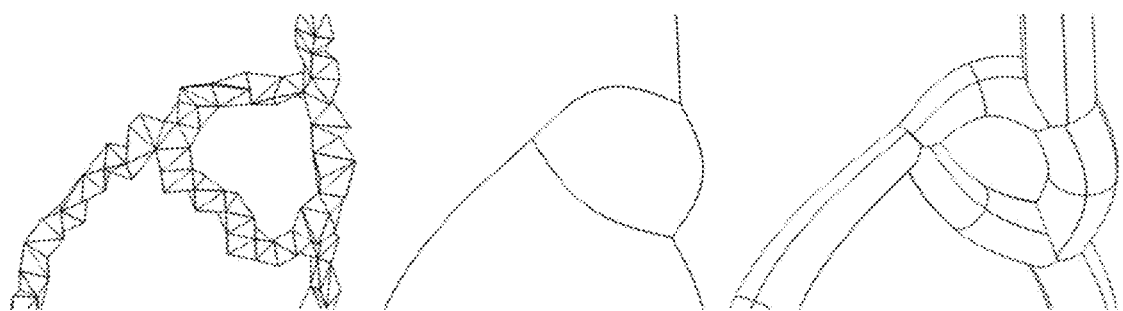

Examples of the method of FIG. 1 in line with the above explanations are now discussed referring to FIGS. 7-68.

An example tetrahedral mesh is now discussed. The input of S10, the output of S10, the input of S20, and/or the output of S20 can be of this type in the method of the example.

A tetrahedral mesh M is defined by its geometry and its combinatorial structure. The geometry is a finite set of 3D points. The combinatorial structure involves tetrahedrons, which in turn define triangles and vertices. A vertex is a reference to a 3D point. An edge is defined by two vertices. A triangle is defined by three vertices, thus defining three edges. A tetrahedron is defined by four vertices, thus defining four triangles and six edges. The 3D shape of a tetrahedron (resp. triangle, edge) is the convex hull of its 3D points. It is a closed subset of $\mathbb{R}^3$.

Tetrahedrons are arranged into a mesh structure in order to define a 3D region. The mesh structure is valid in the following meaning: any two tetrahedrons are either separated, or they share exactly one vertex, or they share exactly one edge or they share exactly one triangle. By definition, two tetrahedrons are adjacent if they share a triangle. In other words, tetrahedrons do not overlap.

FIGS. 7-9 illustrate vertex sharing (FIG. 7), edge sharing (FIG. 8) and triangle sharing (FIG. 9). FIG. 10 shows two adjacent tetrahedrons $T_1$ and $T_2$. They are slightly separated for clarity purpose. FIGS. 11-13 illustrate respectively triangles $f_1, \ldots, f_7$, edges $e_1, \ldots, e_9$ and vertices $v_1, \ldots, v_5$ associated with tetrahedrons $T_1$ and $T_2$. FIG. 14 illustrates the combinatorial structure associated with the previous adjacent tetrahedrons. It captures the " . . . is bounded by . . . " relationship.

The mesh being valid, each triangle is shared by at most two tetrahedrons. A triangle shared by two tetrahedrons is said to be an internal triangle. A triangle bounding only one tetrahedron is said to be a boundary triangle. The boundary of mesh M is the triangulated closed surface defined by all boundary triangles. It is named the boundary surface and is noted ∂M. A tetrahedron bounded by a boundary triangle is named a boundary tetrahedron.

Figure 15:
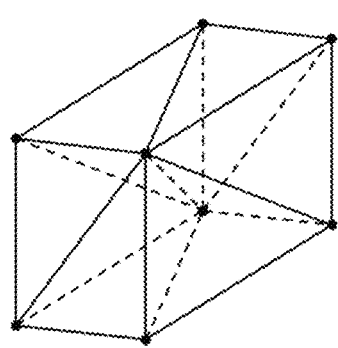
Figure 16:
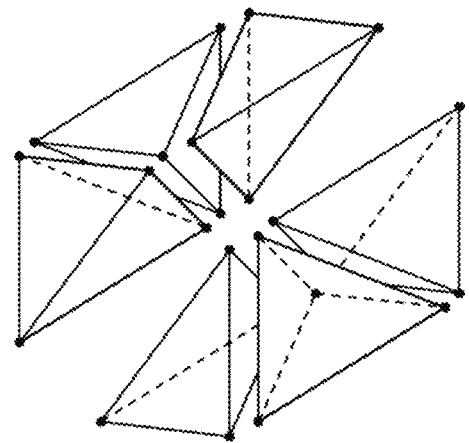
Figure 17:
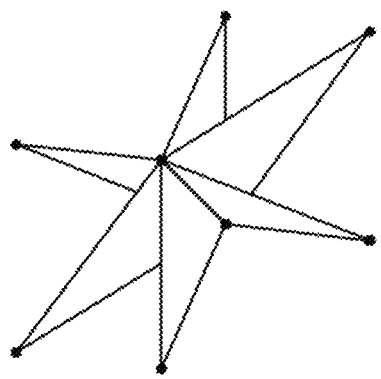
Figure 18:
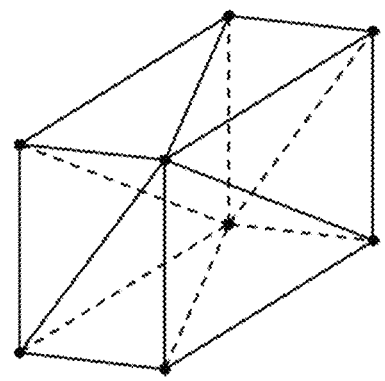

FIGS. 15-16 illustrates a rectangular block (FIG. 15) meshed by six tetrahedrons (FIG. 16). FIG. 17 illustrates internal triangles. FIG. 18 illustrates boundary triangles defining the boundary surface.

Figure 19:
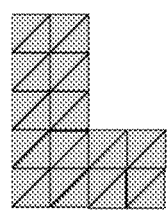
Figure 19:
Figure 19:
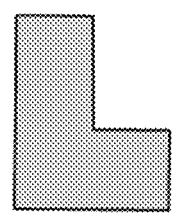
Figure 19:
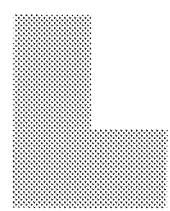
Figure 25:
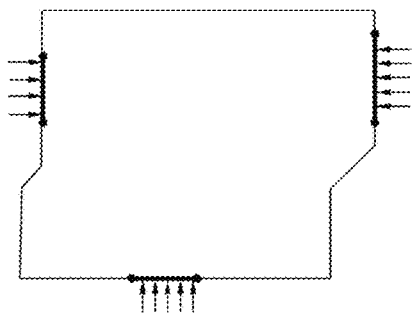

The shape of a tetrahedral mesh noted Shape(M), is the union of all shapes of its tetrahedrons. It is a closed subset of $\mathbb{R}^3$. From the mathematical point of view, the interior of Shape(M) is the largest open set included in Shape(M). It is noted Int (Shape(M)). FIG. 19 illustrates a 2D version of M, ∂M, Shape(M) and Int(Shape(M)).

The earlier-mentioned notion of manifold Versus non manifold vertex and edge is now discussed.

Let S be a closed surface of $\mathbb{R}^3$ and x a point of S. By definition, point X∈S is manifold if there exists a threshold radius $r_0 > 0$ such that for all radius value $0 < r \leq r_0$, set S separates the open ball of radius r centered at X into exactly two pieces. Formally, S is manifold at point X if for all $r \in ]0, r_0]$ the set Ball(X,r)−S includes exactly two connected components, as illustrated in FIGS. 20-21.

Given a regular mesh M as previously defined, one can define the regularity of its boundary surface ∂M by using the manifold concept. In this context, a non-manifold element of ∂M is either a vertex or an edge.

FIG. 22 illustrates a mesh M made of six 3D points and two tetrahedrons sharing a edge. Its boundary surface ∂M includes eight triangles. Any point X inside the shared edge is non manifold because for all sufficiently small r the set Ball(X,r)−∂M is made of four components, as shown on FIG. 23: the inside A of right tetrahedron, the inside B of left tetrahedron, the upper side C of the surrounding space and the lower side D of the surrounding space.

FIG. 24 illustrates a mesh M made of seven 3D points and two tetrahedrons sharing a vertex. Its boundary surface ∂M includes eight triangles. The shared point x∈∂M is non manifold because for all sufficiently small r the set Ball(X, r)−∂M is made of three components: the inside of right tetrahedron, the inside of left tetrahedron and the surrounding space.

The notion of global mesh Versus active mesh is now discussed. Convenient implementations of the method of the examples may make use of this notion. Other implementations may however be contemplated.

The method of the examples may deal with a global tetrahedral mesh G, computed at the beginning of the process and that never changes, together with sub-parts (or subsets) of this global mesh. A sub-part M of the global mesh G is a selection of tetrahedrons of G. Adding a tetrahedron to M is to set "active" a tetrahedron of G−M. Similarly, removing a tetrahedron T from M is to set it "inactive". Consequently, the concept of adjacency must be used by defining the context. Given a tetrahedron T, notation Adj(T) is the set of all tetrahedron of the global mesh G sharing a triangle with T. Notation $Adj_M(T)$ is the set of all tetrahedron of mesh M sharing a triangle with T. Notice that $Adj_M(T)$ is meaningful whether T belongs to M or not.

An example of S10 is now discussed.

Figure 26:
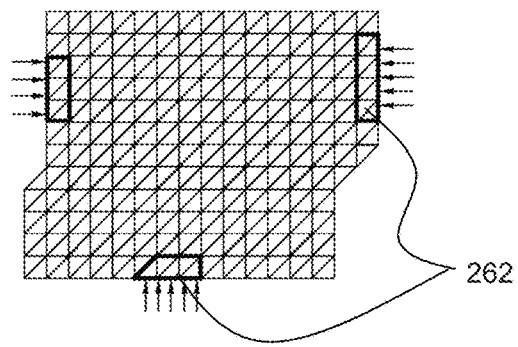

In this example, the user creates a so-called "design space" which is the amount of material containing the (yet unknown) mechanical part. Boundary conditions are defined on the design space like in traditional finite element analysis process. Then, the design space is meshed and, according to the type of boundary conditions, fixed elements are identified. The meshed design space is noted G. FIG. illustrates a design space together with boundary conditions. FIG. 26 is the meshed design space. Fixed elements 262 are within bold lines.

A dedicated algorithm solves the finite elements problem and computes a density field meaning that a scalar value F(T) is associated with each mesh T of G. From now on, and for convenience, the mesh is supposed to be a tetrahedral mesh. It is always possible to change a non-tetrahedral mesh into a tetrahedral mesh.

Roughly speaking, a small value F(T) of the density field means that tetrahedron T does not really contribute to the solution and that it can be removed. Conversely, a high density value F(T) means that tetrahedron T actually contributes to the solution and should be kept. The optimized mesh M includes all tetrahedrons T of G featuring a density value F(T) that is higher than a given threshold.

Figure 27:
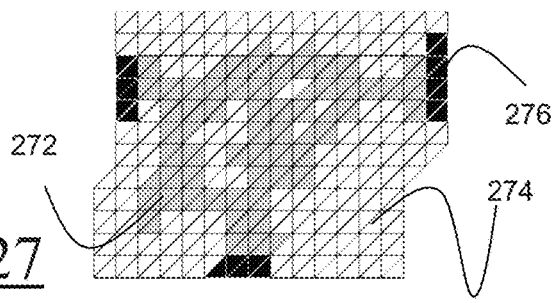

FIG. 27 illustrates the optimized mesh M (grey triangles 272) together with meshed design space G (white triangles 274) and fixed elements (black triangles 276).

Figure 28:
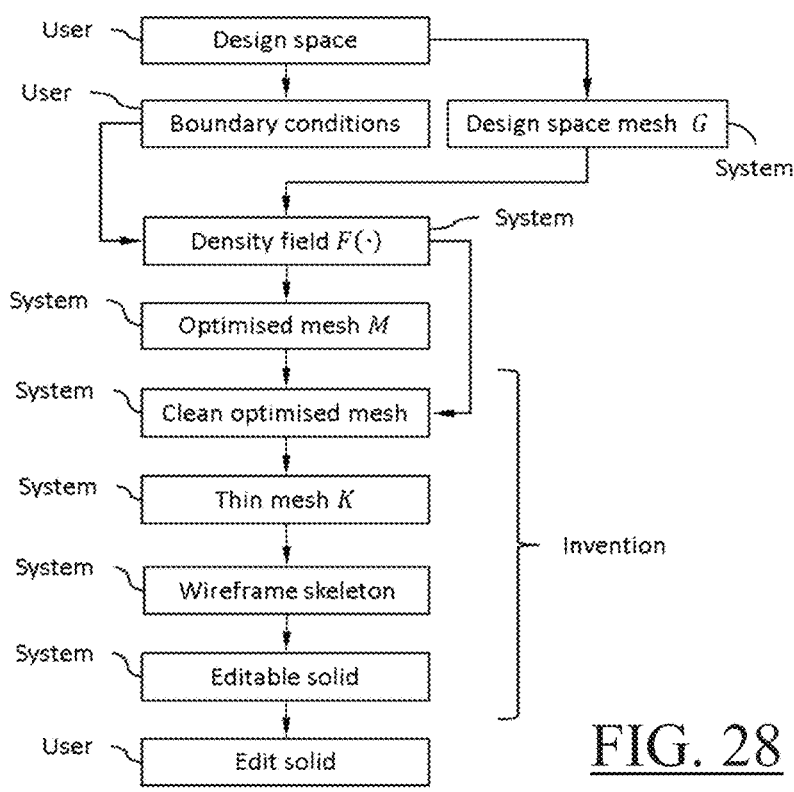

Now, examples of the determining S30 are now discussed, referring notably to a flowchart illustration of examples of the method shown by FIG. 28.

In examples, the method may comprise cleaning the optimized mesh prior to S20 and/or S30. This is now discussed.

The mesh resulting from the topology optimization may feature unwanted singularities. This phenomenon is caused by threshold value applied to the density field that may eliminate isolated tetrahedrons. This leads to small voids inside material.

A first method to solve this problem is to smooth the density field by averaging the field value of each tetrahedron with neighboring values. Noting F(T) the field value of tetrahedron T, its smoothed field value is noted F*(T) and is defined by:

$$F^*(T) = \alpha F(T) + (1-\alpha)\frac{1}{|Adj(T)|}\sum_{T' \in Adj(T)} F(T')$$

Where Adj(T) is the set of tetrahedron adjacent to T and where a typical value of blending parameter is α=0.8.

A second (alternate or additional) solution is to sequentially dilate and erode the tetrahedral mesh. It is well-known from the prior art that this naturally eliminates meaningless small cavities while saving meaningful large cavities, as explained in paper "H. J. A. M. Heijmans, Mathematical morphology: a geometrical approach in image processing, *Nieuw Archief voor Wiskunde*, Ser. 4, Vol. 10, no. 3, pp. 237-276 (November 1992)".

In the context of the method, the dilation operation may be to add to the optimized mesh M all tetrahedrons of G−M adjacent to a boundary triangle of M. The resulting mesh is noted δ(M). The erosion operation may be to remove from a given mesh all tetrahedrons adjacent to a boundary triangle. It is noted ε(M). The regularization is ε(δ(M)). A regularized mesh M=ε(δ(M)) is stable in the following sense M'=ε(δ(M')), meaning that regularizing a regular mesh yields the same mesh.

Figure 29:
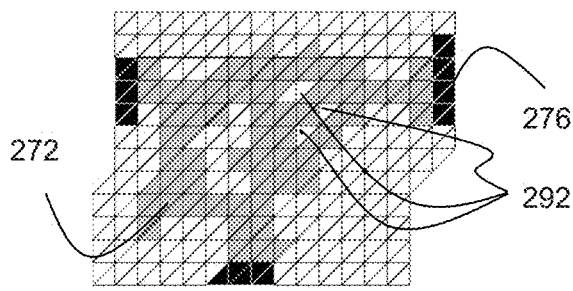
Figure 30:
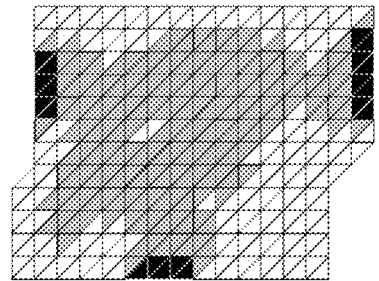
Figure 31:
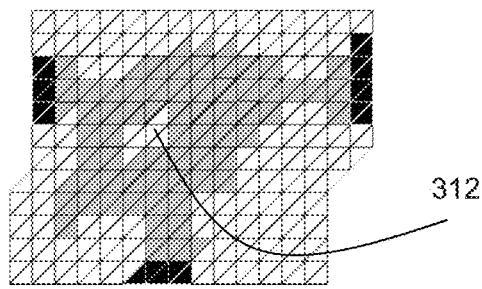

FIG. 29 illustrates the initial mesh M (grey triangles 272 and black triangles 276) featuring cavities (white triangles 292 inside grey triangles). FIG. 30 illustrates the corresponding dilated mesh δ(M). Notice that small cavities are filled. FIG. 31 illustrates the erosion of the dilated mesh ε(δ(M)). Clearly, small cavities are filled while the overall shape, including the large cavity 312, is globally saved.

In practice, the dilation/erosion process can be implemented as follows. The dilation step is computed but the erosion step is included in the first iteration of the thinning process, explained in the following.

A notion of relevant topology for mesh M that suits the context of mechanical design is now discussed. The method of the examples allows reaching such relevancy.

In theory, the boundary surface ∂M of mesh M is expected to be a manifold surface since Shape(M) is intended to represent a physical object. Unfortunately, this hypothesis is not realistic because of the huge number of tetrahedrons in global mesh G and because of the unavoidable threshold side effects on the density field. Mesh M may feature non-manifold edges and/or non-manifold vertices and the invention is designed to deal with this.

Figure 32:
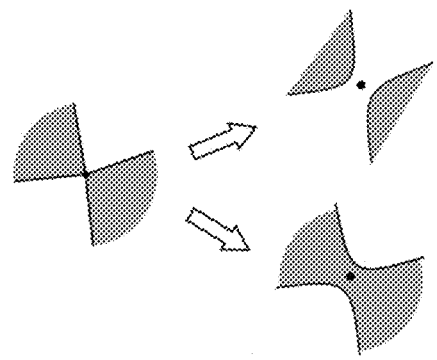

A decision must be made on how to consider a singularity. A non-manifold edge (or vertex) is a theoretical zero thickness zone, which is a non-sense from the physical point of view. Depending on the application, this zero thickness is interpreted as "there is no material" or "there is a very small quantity of material", as illustrated in FIG. 32.

In the context of the method, the decision may be that a singularity is a "no material" situation. For this reason, the relevant topology of mesh M is the one of its interior, previously defined and noted Int(Shape(M)). Further algorithms of the method may be designed according to this principle.

Examples of the thinning of the optimized mesh at S30 are now discussed.

A goal of thinning mesh M may be to get a mesh K featuring as few tetrahedrons as possible in order to disclose a skeleton structure with the same topology as Int(Shape (M)). This is a specificity of the method compared to other thinning algorithms which save the topology of the closed set Shape(M). In addition, tetrahedrons supporting the boundary conditions may be set fixed, meaning that they are not removed and that they all belong to the final mesh K.

An example of an overall algorithm of the method in line with the above-discussed examples is now discussed.

The principle is to iteratively remove (non-fixed) boundary tetrahedrons according to an appropriate criterion (step 05 in the below pseudo-code). In other words, the elements of the subset being removed at each respective iteration of the thinning process are all the boundary elements of the subset at the respective iteration whose removal is not forbidden.

Also, at each iteration the thinning process may remove boundary elements of the subset according to their number of adjacency faces shared with another element of the subset, from the lowest number to the highest number. In other words, tetrahedrons featuring the smallest number of adjacent triangles (i.e. in the face-sharing adjacency sense) are removed in priority (step 03 below). Such a specific order in the iteration allows reaching a result that does not delete relevant shapes, unlike in prior art thinning where some relevant shapes (typically a protrusion) can be totally eroded and lost during the thinning, even when unsatisfactory tuning parameters and heuristics are involved to avoid the phenomenon.

The algorithm may thus be as the following pseudo-code:

```
00  K:=M
01  Repeat
02      Let n be the number of tetrahedrons of
        mesh K
03      Let K_0 be the set of selected
        boundary tetrahedrons of mesh K
04      For all tetrahedron T ∈ K_0 do begin
05          If tetrahedron T can be
            removed from K then
06              Remove tetrahedron T from
                mesh K
07          End if
08      End for
09  Until the number of tetrahedrons of K is
    equal to n
```

The algorithm ends when no boundary tetrahedron is removed. The resulting mesh K is minimal, but it is not unique. Its shape depends of the sequence of tetrahedrons in $K_0$. Tests have shown that this is not problematic.

An example for selecting the set of boundary tetrahedrons at step 03 is now provided.

The number of adjacent tetrahedrons of a tetrahedron T of mesh K is noted $|Adj_K(T)|$. Clearly, $0 \leq |Adj_K(T)| \leq 4$. When $|Adj_K(T)|=4$, tetrahedron T is not a boundary tetrahedron of K. It is a boundary tetrahedron of K otherwise. The set $K_0$ is computed by collecting (non-fixed) tetrahedrons featuring the smallest number of adjacent tetrahedrons.

The selection may thus be as the following pseudo-code:

```
K_0:=∅
j:=0
    While K_0 = ∅ and j ≤ 3 do begin
        K_0:={T ∈ K;|Adj_K(T)| = j and T is non fixed }
    j:=j + 1
    End while
```

An example of the logical test performed at step 05 is now explained.

It must be understood that the boundary surface ∂M of the input mesh M may feature non-manifold edges and/or vertices. The principle is to remove a (non-fixed) boundary tetrahedron as long as this does not create any additional non-manifold edge or vertex. Nevertheless, some existing non-manifold situation can be removed, and thus create disconnections, as long as the topology of Int(Shape(M)) is saved. A dedicated section illustrates this phenomenon.

Given a tetrahedron T collected in set $K_0$, and given one of its edges E, a first analysis may be performed as follows. Among all tetrahedrons of G sharing edge E, there are tetrahedron T itself, at most two tetrahedrons that are adjacent to T and other tetrahedrons that are not adjacent to T.

The analysis may be performed according to the pseudo-code of the following logical function:

```
CanBeRemoved_1(K,T,E)
    A:= all tetrahedrons of G sharing edge E and
    sharing a triangle with T
    B:= all tetrahedrons of G sharing edge E and not
    sharing any triangle with T
    If (|A| = 2 and all elements of A belong to K) and (
    |B| = 0 or at least one element of B does not belong
    to K) then
        Return FALSE
    Else
        Return TRUE
    End if
```

In the "if . . . then" instruction, cardinality tests ($|A|=2$, $|B|=0$) are significant when edge E is a boundary edge of mesh G. In this case, set A can be empty or can include only one tetrahedron and set B can be empty as well. The cardinality tests are designed in such a way that the outside of mesh G behaves like tetrahedrons that do not belong to K.

Figure 33:
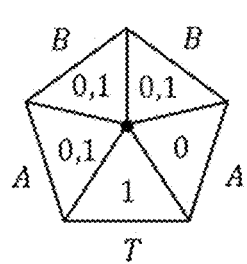
Figure 34:
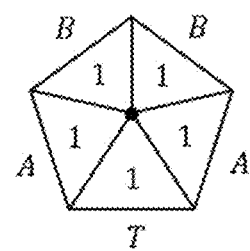

Considering an edge E that is not a boundary edge of G, FIGS. 33-34 illustrate all possible situations when function CanBeRemoved_1(K,T,E) returns TRUE. The edge E (dot) shared by tetrahedrons is perpendicular to the drawing plane. Triangle featuring value 1 (resp. value 0) belongs to K (resp. does not belong to K). Symbols A, B refer to sets of tetrahedrons built by the function.

Figure 35:
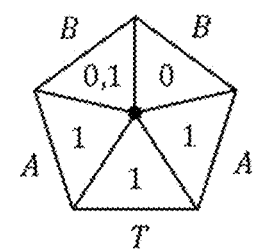

Still considering an edge E that is not a boundary edge of G, FIG. 35 illustrates all possible situations when function CanBeRemoved_1(K,T,E) returns FALSE. Removing T would create a non-manifold edge.

Given a tetrahedron T to be removed, and given one of its vertices V, a second analysis is performed as follows. Among all tetrahedrons sharing vertex V, there are tetrahedron T itself, at most three tetrahedrons that are adjacent to T and other tetrahedrons that are not adjacent to T.

The analysis may be performed according to the pseudo-code of the following logical function:

```
CanBeRemoved_0(K,T,V)
    A:= all tetrahedrons of G sharing vertex V and
    sharing a triangle with T
    B:= all tetrahedrons of G sharing vertex V and not
    sharing any triangle with T
        If (|A| = 3 and all elements of A belong to K)
        and (|B| = 0 or at least one element of B does
        not belong to K) then
            Return FALSE
        Else
            Return TRUE
        End if
```

Here again, the "if . . . then" instruction features cardinality tests ($|A|=3$, $|B|=0$) that are significant when vertex V is a boundary edge of mesh G. In this case, set A can be empty or can include only one or two tetrahedrons and set B can be empty as well. The cardinality tests are designed in such a way that the outside of mesh G behaves like tetrahedrons that do not belong to K.

The final testing, which is step 05 of the algorithm, may be performed by applying the previous functions to all edges and vertices of the candidate tetrahedrons. This can be performed according to the following pseudo-code:

```
CanBeRemoved(K,T)
    For each edge E of tetrahedron T do begin
        If (not CanBeRemoved_1(K,T,E)) return FALSE
    End for
    For each vertex V of tetrahedron T do begin
        If (not CanBeRemoved_0(K,T,V)) return FALSE
    End for
    Return TRUE
```

An illustration of such thinning process is provided with reference to FIGS. 36-44.

Figure 36:
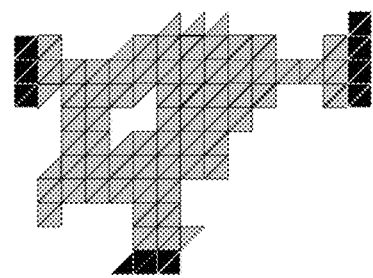
Figure 37:
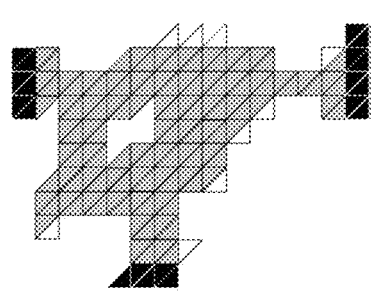
Figure 38:
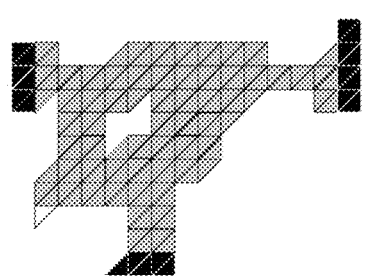
Figure 39:
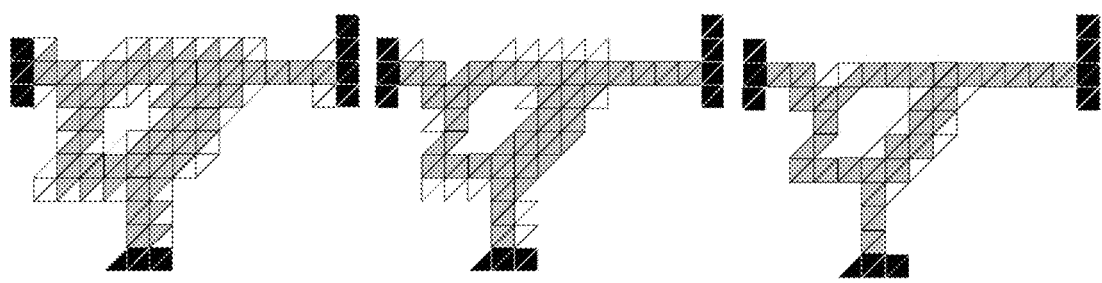
Figure 40:
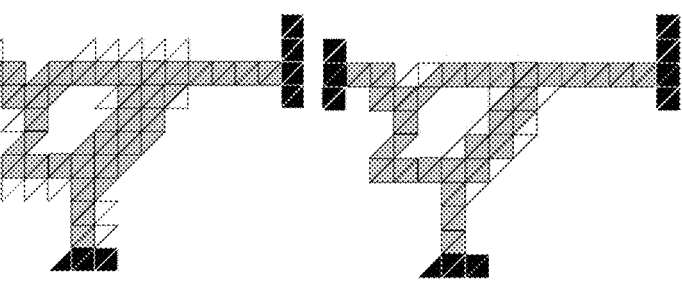
Figure 41:
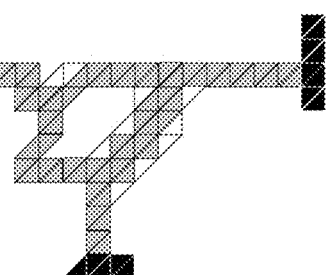
Figure 42:
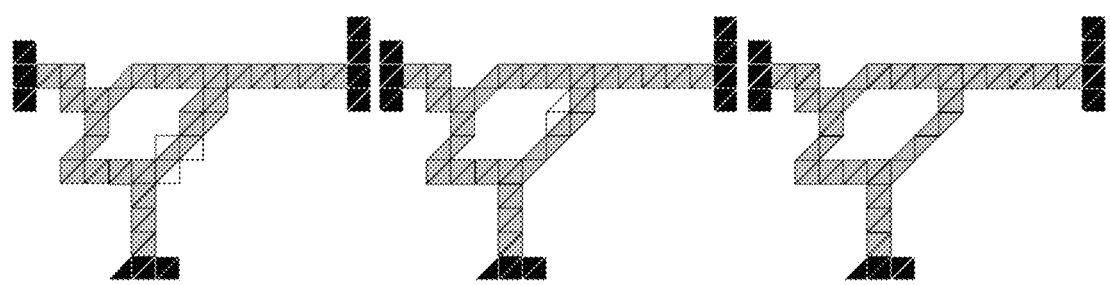
Figure 43:
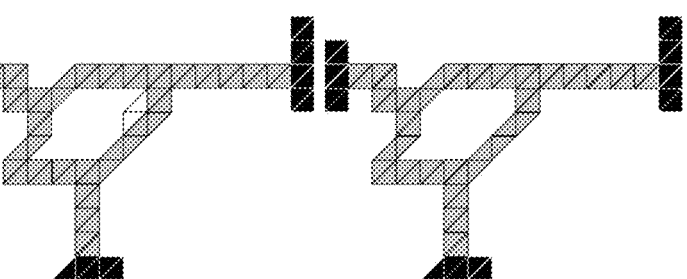

FIGS. 36-38 illustrate the first thinning iterations on the exemplary 2D mesh. FIG. 36 is the initial mesh K=M. The thinning process removes triangles with the smallest number of adjacent triangles, as illustrated by white triangles. Removed triangles in FIG. 37 have only one adjacent triangle. Removed triangle in FIG. 38 has only one adjacent triangle.

Figure 44:
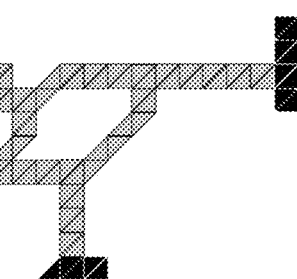
Figure 45:
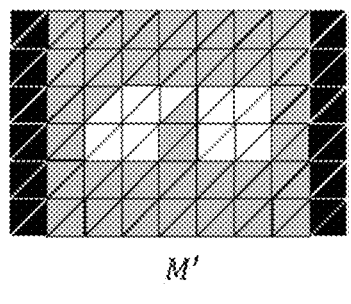

Iterations yields the intermediates versions of mesh K shown on FIGS. 39-44. Removed triangles in FIG. 39 have two adjacent triangles. Removed triangles in FIG. 40 have only one adjacent triangle. FIG. 44 is the skeleton mesh, that is the final version of K. No triangle can be removed from K.

This illustrates the benefit of fixed tetrahedrons defined by using boundary conditions prior to the thinning process. Without these fixed all dangling branches would be removed and the result would be the central loop only.

Now that the thinning process is known, FIGS. 45-51 illustrate the interior topology saving. Consider the 2D mesh M' shown on FIG. 45. It features a non-manifold vertex at the junction of the two cavities.

Figure 46:
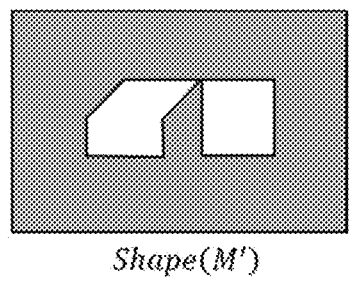
Figure 47:
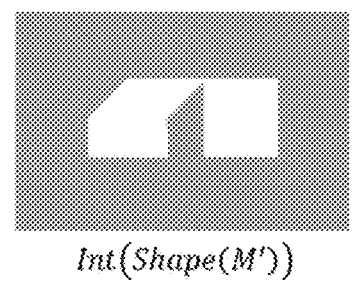

The object Shape(M') of M being a closed set, it actually features two cavities, as illustrated in FIG. 46. Conversely, the open set Int(Shape(M')) features only one cavity as illustrated FIG. 47. This is because the pointwise connection between cavities is "opened" by considering the interior set.

In terms of intervals, the two cavities of the closed set Shape(M') are open sets and they behave like ]a,b[∪]b,c[, which is made of two disjoint (open) intervals. The cavities of the open set Inc(Shape(M')) are closed sets, and they behave like [a,b]∪[b,c] which is a single (closed) interval. Thus, the open Int(Shape(M')) features only one cavity.

Figure 48:
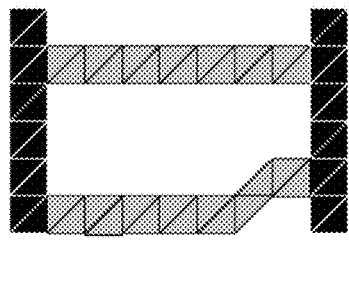
Figure 49:
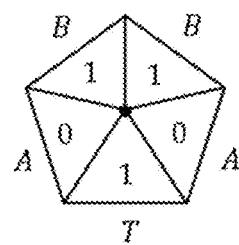
Figure 50:
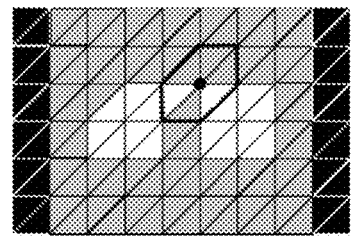
Figure 51:
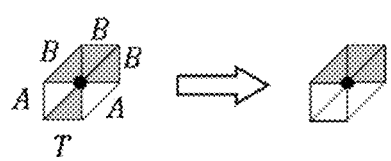

As expected, the thinning algorithm yields a mesh K' with one cavity, as illustrated in FIG. 48. The singularity removal is allowed by the configuration shown on FIG. 49, as detailed previously. That is shown on FIGS. 50-51.

Examples of the representation of the skeleton determined at S30 are now discussed, starting from the results provided by the above examples of the thinning process.

An example of a wireframe skeleton is now discussed.

Figure 52:
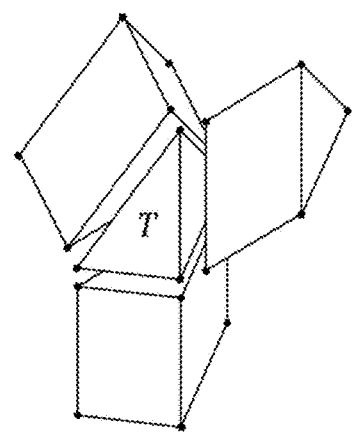

The skeleton mesh K may indeed now be used to compute a wireframe skeleton made of line segments. In its first version, this wireframe skeleton generally features sharp points, but it may be smoothed in a further step. Each tetrahedron of K is either a branch tetrahedron or a node tetrahedron. By definition, a branch tetrahedron is adjacent to exactly two tetrahedrons, a node tetrahedron is adjacent to three or four tetrahedrons and an end tetrahedron is adjacent to only one tetrahedron. FIG. 52 locally illustrates three branches joining at node tetrahedron T.

The branch recognition may be as follows. Only fixed node tetrahedrons, non-fixed node tetrahedrons and non-fixed branch tetrahedrons are involved in the wireframe skeleton definition. Let K* be the set of such tetrahedrons. Each branch is recognized by locating an initial non-visited branch tetrahedron $T_0$ and by adjacency propagation from $T_0$, on both sides, until a node tetrahedron or a visited tetrahedron. Before starting the algorithm, all tetrahedrons are set "non-visited".

This can be performed according to the following pseudo-code:

```
While exists a non-visited branch tetrahedron T₀
of K* do begin
    B:= new branch
    B:=B ∪ {T₀}
    Set T₀ visited
    For i:=1 et 2 do begin
        T:=T₀
        While exists a non-visited branch
        neighbor T' of T in K* do begin
            B:=B ∪ {T'}
            Set T' visited
            T:=T'
        End while
    End for
End while
```

The algorithm ends when all branch tetrahedrons are visited, meaning that each branch tetrahedron is associated with a unique branch.

Figure 53:
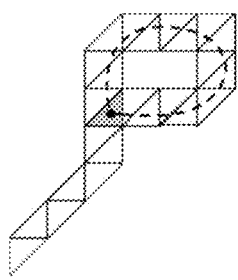
Figure 54:
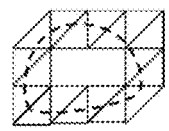

Branches starting and ending at the same node tetrahedron are discarded. Branches including no node tetrahedron are isolated loops and they are discarded as well. Discarding such branches may create new removable boundary tetrahedrons. For this reason, the thinning process is run again. FIGS. 53-54 illustrate discarded closed branches in dotted lines.

Figure 55:
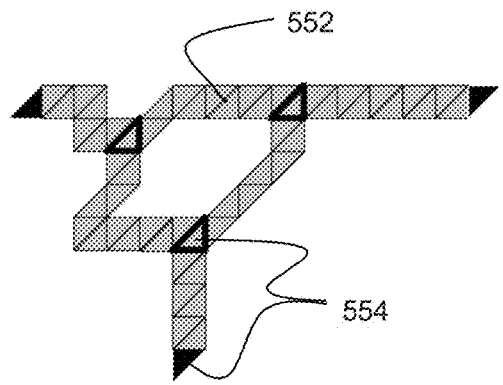

FIG. 55 illustrates K* defined by branch triangles 552 (grey with thin contour) and node triangles 554 (black or grey with bold contour). Fixed branch and end triangles are not illustrated.

Figure 56:
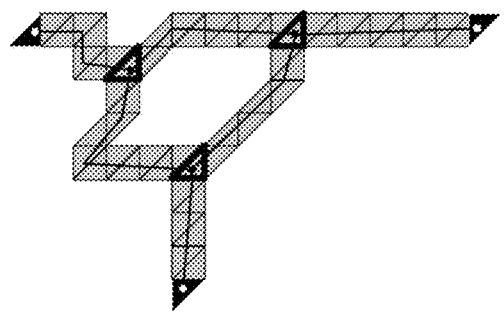

A 3D point may be created at the center of gravity of each node tetrahedron. Then polylines may be created between these points by following adjacent branch tetrahedrons, as illustrated in FIG. 56.

Figure 57:
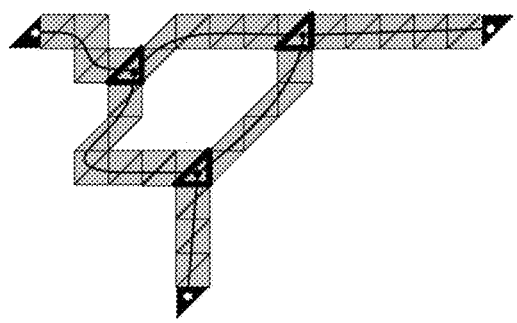

Then, each polyline may be smoothed by computing a spline curve through end points and the middle point, as illustrated in FIG. 57. Of course, more points can be involved in the spine curves definitions.

The earlier-mentioned creation of swept volumes within examples of S30 is now discussed.

Each smooth branch may be used as the spine curve of a swept solid. The profile swept along the spine curve is a variable radius circle. Its center point is on the spine curve, and the radius variation is computed by approximating the local size of optimized mesh M.

Formally, let $Q:[0,1] \to \mathbb{R}^3$ be the spine curve. A goal may be to compute a section distribution, for example in the form of a radius variation $r:[0,1] \to \mathbb{R}$. At parameter $t \in [0,1]$, the section of the swept volume is the circle centered at Q(t) with radius r(t) in the plane through Q(t) and perpendicular to vector Q'(t).

Examples of how to perform local size approximation are now discussed. This information (e.g. obtained earlier during the thinning) can be used by the computation of the section distribution.

Figure 58:
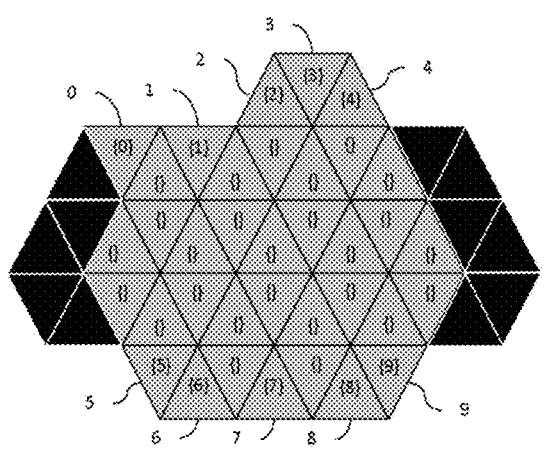

During the thinning process, some logical information about tetrahedrons elimination may be stored for this purpose. Initially, each boundary tetrahedron of mesh M may be associated with an identifier and a set of identifiers. The set of each boundary tetrahedron may be initiated with the identifier of the said tetrahedron. All non-boundary tetrahedrons may be associated with an empty set noted { }. FIG. 58 illustrates the initial situation. Boundary tetrahedrons are symbolically identified by numbers from 0 to 9.

Figure 59:
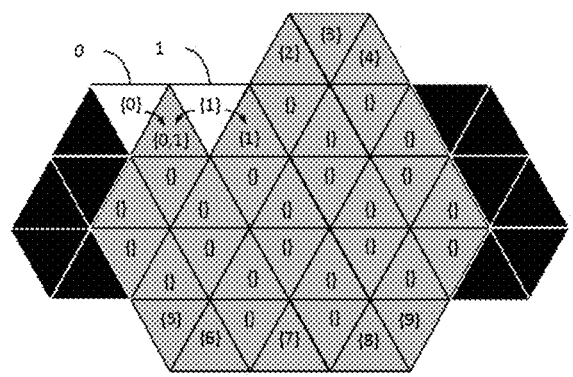

Then, each time a boundary tetrahedron is eliminated, its set may be added to the sets of all its neighboring tetrahedrons. FIG. 59 illustrates the elimination of boundary tetrahedrons 0 and 1. Notice the non-empty sets of adjacent tetrahedrons.

Figure 60:
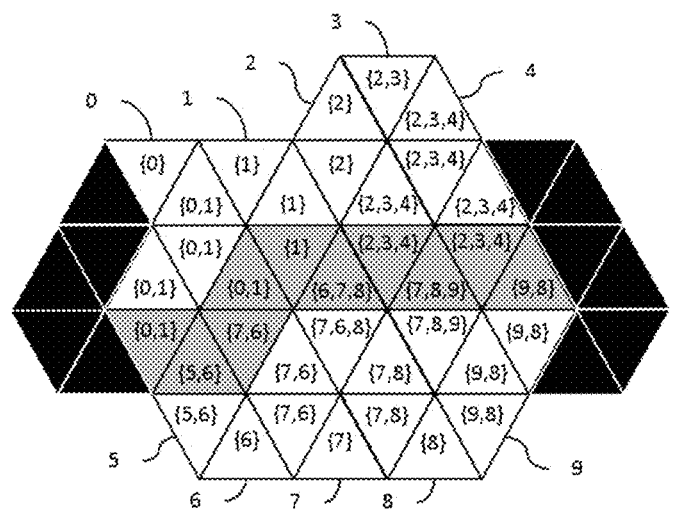

When the thinning process is ended, each resulting branch tetrahedron T may be associated with a set of boundary tetrahedrons identifiers $L(T)=(i_1, \ldots, i_{b(T)})$ where b(T) is the number of elements in set L(T). FIG. 60 illustrates the final status.

The approximated local radius r(T) of the branch including branch tetrahedron T is the average distance from tetrahedron T to tetrahedrons of its set. The distance between two tetrahedrons is the distance between their respective average points.

$$r(T) = \frac{1}{b(T)} \sum_{k=1}^{b(T)} \text{Distance}(T, i_k)$$

Figure 61:
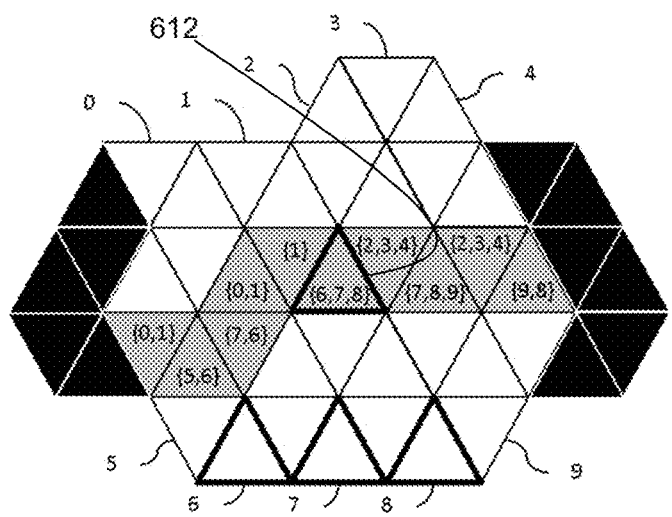

For example, the local radius of branch tetrahedron T (bold contour 612 in FIG. 61) associated with set {6,7,8} is the mean distance between T and boundary tetrahedrons 6, 7 and 8, as illustrated FIG. 61.

The local size approximation depends on the boundary tetrahedrons elimination ordering. Nevertheless, tests show that this does not significantly affect the resulting shape.

Examples of constructing swept volume are now discussed.

Figure 62:
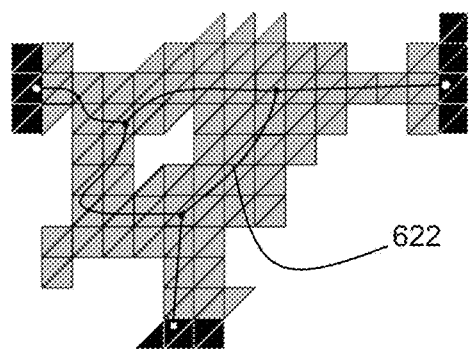

Referring to FIG. 62, given the spine curve 622, the variable radius variation is defined by interpolating the approximated local size at the end points and at the middle point of the spine curve. Here again, more points can be involved. The resulting swept solid is now well-defined.

Figure 63:
Figure 64:
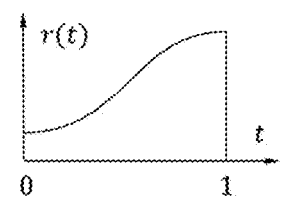
Figure 65:
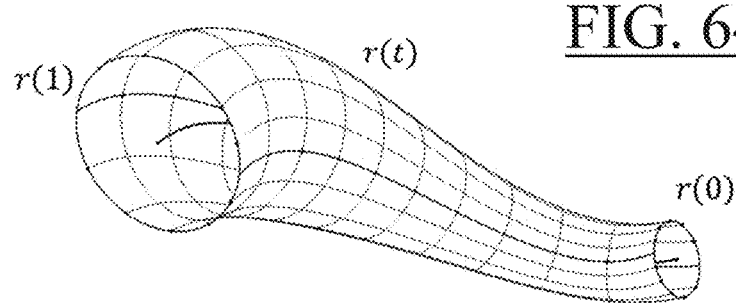

The B-Rep of this solid is a parameterized surface created by using rotation minimizing frame computation. This can be performed as described in paper "Wang, W., Jüttler, B., Zheng, D., and Liu, Y. 2008. Computation of rotation minimizing frame. ACM Trans. Graph. 27, 1, Article 2 (March 2008)". FIGS. 63-64 illustrate a 3D spine curve together with a smooth radius variation. FIG. 65 illustrates the corresponding swept surface. The editable solid is the Boolean union of all swept solids captured in a classical history feature list. Fillets may be automatically added in order to get a smooth the final shape.

FIGS. 66-68 illustrates, on a real 3D example, the local shape of the skeleton structure (FIG. 66) the smoothed wireframe structure (FIG. 67) and the final solid combining swept volumes (FIG. 68).

Examples of solid edition that can be performed at S40 are now discussed.

There may be two ways to edit the resulting solid. The first one is to deal with the classical history tree of swept volumes and fillets. The second one is to keep the link between the faces, edges and vertices of the solid and the branches of the skeleton. When the user selects a face, edge or vertex of the solid, the user action may be performed on associated the branch and possibly on the rest of skeleton (move, remove a branch for example, with effects on adjacent branches). Then the swept volume generation, Boolean operations and fillets may be replayed. Alternatively, for some user actions the structure of the skeleton is not modified: for example, if the section of a branch is modified (changing form a circular section to an elliptic one) only the swept volume and subsequent operations may be replayed.

The invention claimed is:

1. A computer-implemented method for designing a mechanical part, the method comprising:
   obtaining a subset of a finite element mesh (FEM), the subset of the FEM representing the mechanical part; and
   determining a representation of a skeleton of the mechanical part based on the subset of the FEM, the representation of the skeleton having branches and branch junctions, each branch junction joining respective branches,
   wherein the representation of the skeleton has the same topology as the result of applying a thinning process to the subset,
   wherein the result of applying the thinning process comprises elements of the FEM that each correspond to a respective branch extremity and elements of the FEM that each correspond to a respective branch junction, each element of the FEM that corresponds to a respective branch extremity sharing a face with a respective element of the FEM that corresponds to a branch junction, and
   wherein each operation step of the thinning process is configured to be executed to not yield a local non-manifold surface geometry, such that the thinning process forbids creation of a local non-manifold surface geometry.

2. The method of claim 1, wherein the subset results from a topology optimization process and has elements that correspond to boundary conditions of the topology optimization process, the thinning process forbidding removal of the elements of the subset that correspond to the boundary conditions of the topology optimization process.

3. The method of claim 1, wherein the thinning process comprises iterating removal of elements of the subset, the elements of the subset being removed at each respective iteration being all boundary elements of the subset at the respective iteration whose removal is not forbidden.

4. The method of claim 3, wherein at each iteration the thinning process removes boundary elements of the subset according to their number of adjacency faces shared with another element of the subset, from the lowest number to the highest number.

5. The method of claim 1, further comprising performing a design based on the representation of the skeleton.

6. The method of claim 1, further comprising, prior to obtaining the subset of the FEM, performing a topology optimization process to determine the subset of a FEM.

7. A method for manufacturing a mechanical part designed according to a computer-implemented method for designing the mechanical part, the computer-implemented method comprising:

obtaining a subset of a finite element mesh (FEM), the subset of the FEM representing the mechanical part; and determining a representation of a skeleton of the mechanical part based on the subset of the FEM, the skeleton having branches and branch junctions, each branch junction joining respective branches, wherein the representation of the skeleton has the same topology as the result of applying a thinning process to the subset, wherein the result of applying the thinning process comprises elements of the FEM that each correspond to a respective branch extremity and elements of the FEM that each correspond to a respective branch junction, each element of the FEM that corresponds to a respective branch extremity sharing a face with a respective element of the FEM that corresponds to a branch junction, and wherein each operation step of the thinning process is configured to be executed to not yield a local non-manifold surface geometry, such that the thinning process forbids creation of a local non-manifold surface geometry.

8. A device comprising:

processing circuitry;

a non-transitory memory having recorded thereon a computer program comprising instructions for designing a mechanical part that when executed by the processing circuitry causes the processing circuitry to be configured to obtain a subset of a finite element mesh (FEM), the subset of the FEM representing the mechanical part; and determine a representation of a skeleton of the mechanical part based on the subset of the FEM, the representation of the skeleton having branches and branch junctions, each branch junction joining respective branches, wherein the representation of the skeleton has the same topology as the result of applying a thinning process to the subset, wherein the result of applying the thinning process comprises elements of the FEM that each correspond to a respective branch extremity and elements of the FEM that each correspond to a respective branch junction, each element of the FEM that corresponds to a respective branch extremity sharing a face with a respective element of the FEM that corresponds to a branch junction, and wherein each operation step of the thinning process is configured to be executed to not yield a local non-manifold surface geometry, such that the thinning process forbids creation of a local non-manifold surface geometry.

9. The device of claim 8, wherein the processing circuitry is coupled to the memory and to a graphical user interface, the device being a computer system.

10. A non-transitory data storage medium having stored thereon a computer program comprising instructions for performing a computer-implemented method according to claim 1.

* * * * *